United States Patent [19]

Murdock et al.

[11] Patent Number: 4,680,429

[45] Date of Patent: Jul. 14, 1987

[54] TOUCH PANEL

[75] Inventors: Bruce Murdock, Beaverton; Daniel G. Teichmer, Portland, both of Oreg.

[73] Assignee: Tektronix, Inc., Beaverton, Oreg.

[21] Appl. No.: 819,949

[22] Filed: Jan. 15, 1986

[51] Int. Cl.[4] ............................................. G08C 21/00
[52] U.S. Cl. ...................................... 178/19; 340/706
[58] Field of Search ...................... 17/18, 19; 340/712, 340/706

[56] References Cited

U.S. PATENT DOCUMENTS 3,497,617  2/1970  Ellis ........................................ 178/19
4,198,539  4/1980  Pepper .................................... 178/18

*Primary Examiner*—Stafford D. Schreyer
*Attorney, Agent, or Firm*—John D. Winkelman; David P. Petersen

[57] ABSTRACT

A touch panel has panel scanning signals selectively applied to the four sides of a touch sensing surface of the panel so as to establish alternating current voltage gradients in desired directions across the touch sensing surface. When the panel is touched, touch currents result and are utilized by a touch location circuit in determining the location of touch. The impedance touch current resulting from a user's touch may also be determined and used. The touch panel circuit automatically compensates for changes in impedance touch current, such as results when users touch the panel with ungloved and gloved fingers.

27 Claims, 10 Drawing Figures

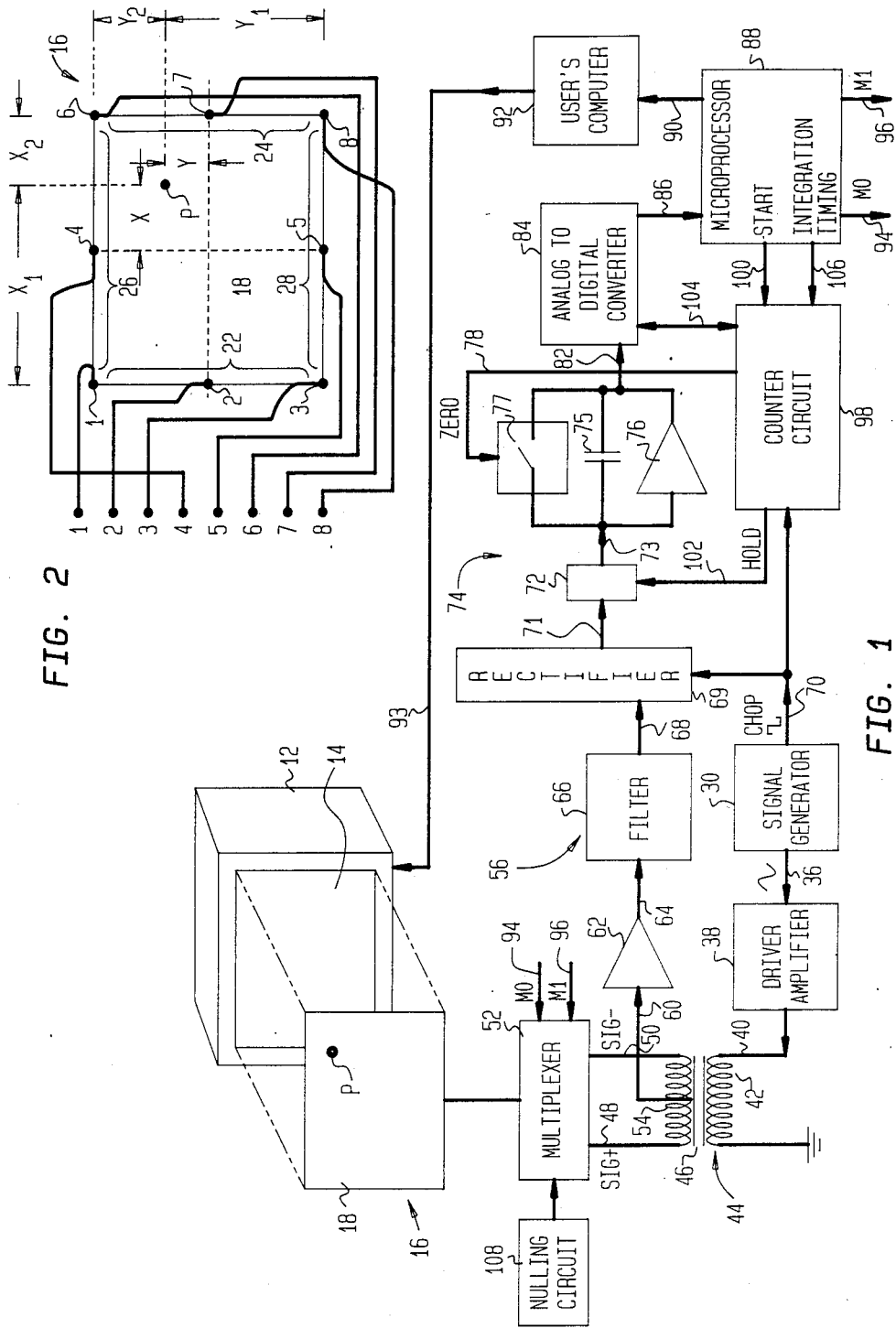

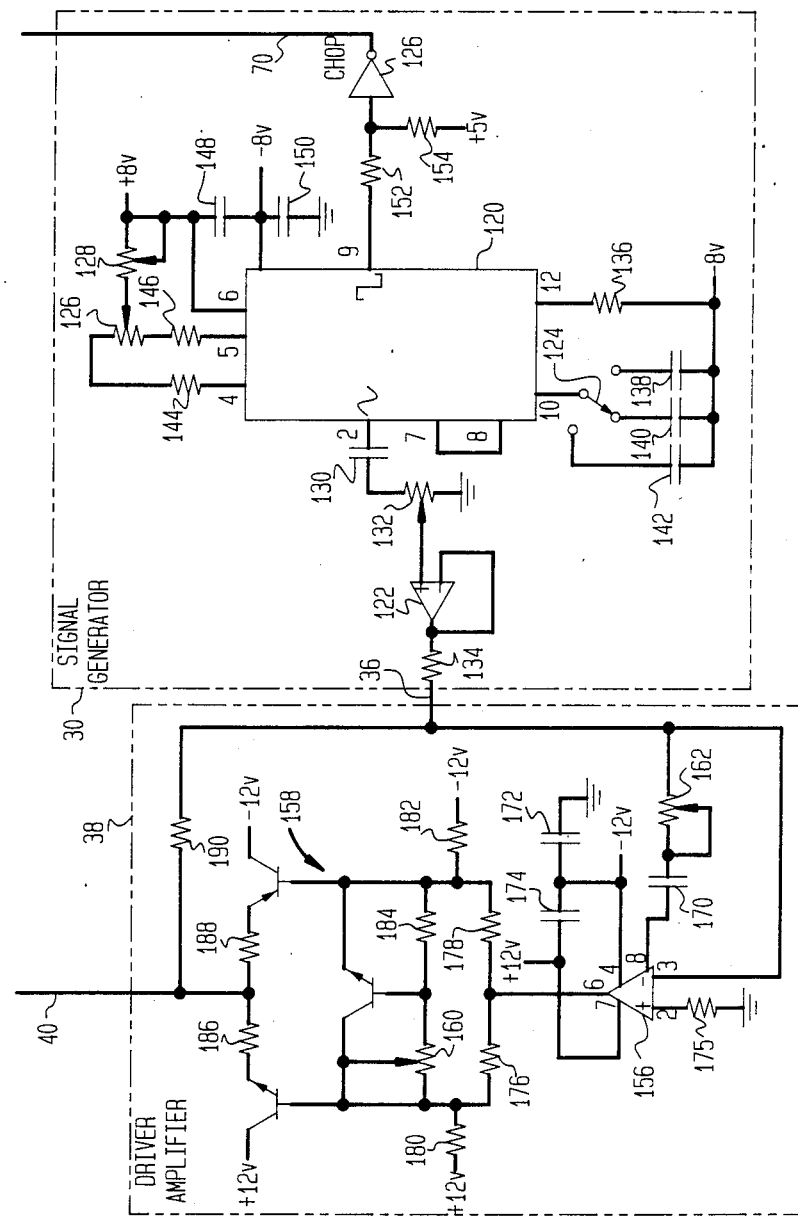

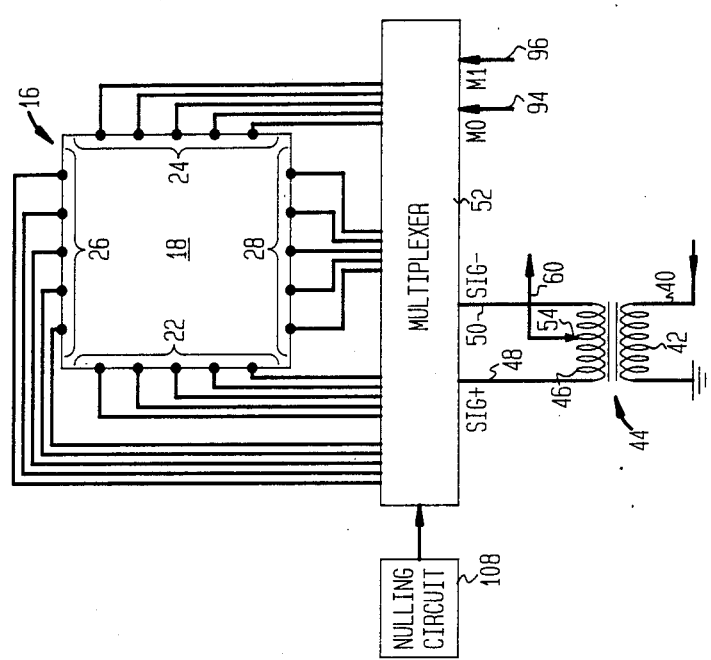
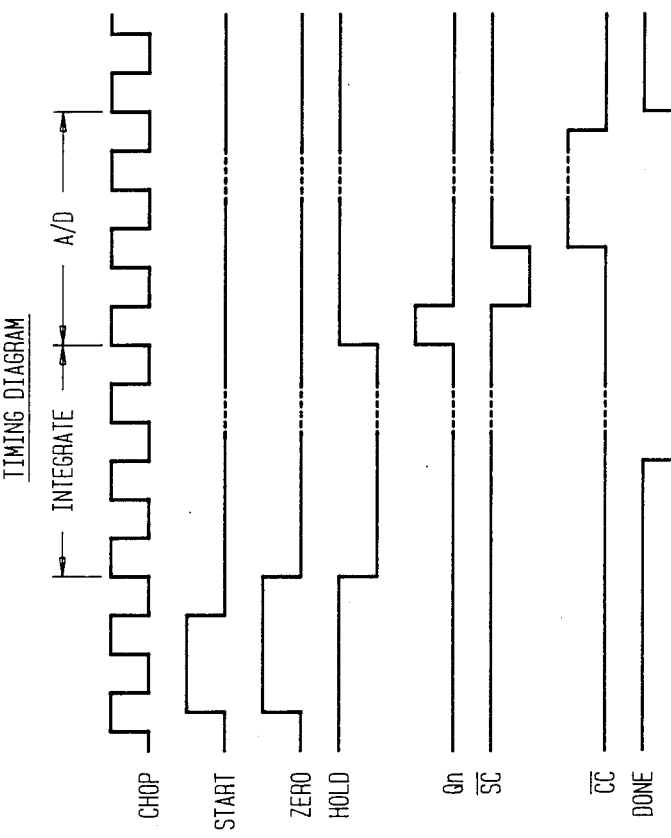

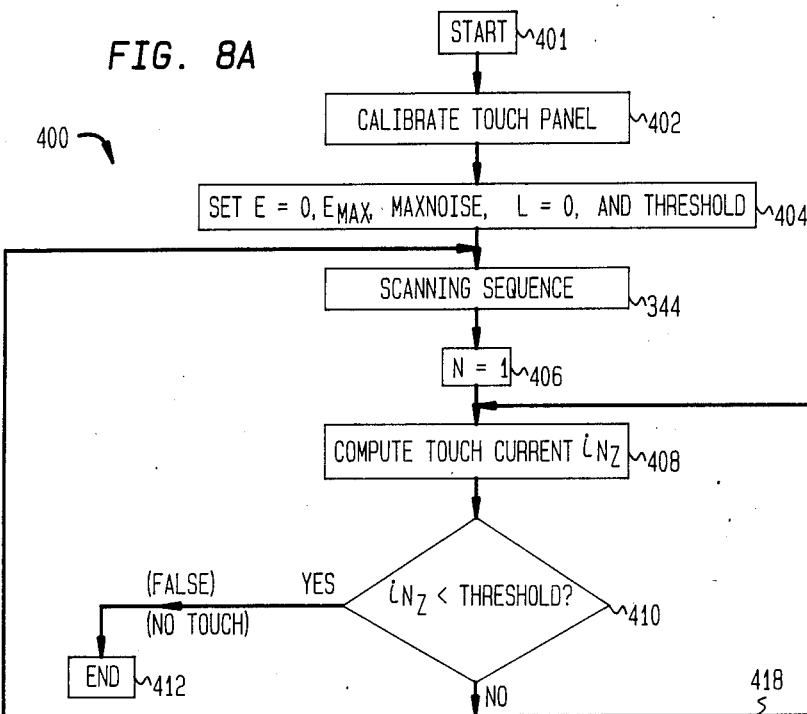

TOUCH PANEL

Technical Field

This invention relates to a touch panel having a touch sensing surface and also to a touch panel device having circuitry for determining the location, which may in essence be any location, at which the touch sensing surface of the device is touched. In addition, the invention relates to methods of determining the location at which such a touch sensing surface is touched.

The invention may be used with a wide variety of display devices of the type which display information from which a user makes a selection. One example is a lap held tablet in which a user selects and touches the device to, for example, indicate a response to a question. A further example is user selection of information items displayed on the screen of a display terminal, such as a cathode-ray tube (CRT) terminal, which is connected to a computerized information processing system.

Cathode-ray tube display terminals are known which employ a touch panel with a set pattern of touch sections over a terminal display screen. The terminal responds to touch at any section in the prescribed pattern and identifies the location of the touched section. Such a system typically employs a capacitive sensing technique. That is, a controller continually transmits a scanning signal across the touch panel and samples the sections until a touch is detected. When one of the sections is touched by a user, the capacitance of the user's body is added to the circuit. The controller senses the resulting change in capacitance and identifies the pattern section which is touched.

One example of such a touch responsive terminal is manufactured by RGB Dynamics of Salt Lake City, Utah. In the RGB device, a touch sensitive surface is comprised of indium tin oxide which is applied to a glass base plate. The coating is patterned in discrete sections with conductors coupling each section to an electrical detection circuit. Such patterning limits the touch resolution to the size of the patterned sections. Also, touch detection is limited by the particular pattern of sections employed. In addition, a complex wiring arrangement is required to make electrical contact with each of the patterned sections. Such complex connection schemes are more prone to failure and more costly than simpler arrangements.

Another known practice employs a pattern of transparent mechanical switches over a display. Sierracin/Intrex Products of Sylmar, Calif. markets Transflex (TM) brand switches of this type. More specifically, this particular type of device employs membrane sheets which are pressed together at the touch of a user to make electrical contact. When the films are pressed together at a location, current flows in a specific circuit and identifies the location. Another membrane type touch panel of this type is disclosed in U.S. Pat. No. 4,484,038 of Dorman, et al.

Also, as described in a product bulletin, Dorman-Bogdonoff Corp. of Andover, Mass. has a prior art Series 1000 touch screen device utilizing an unpatterned membrane switch type touch panel. The Series 1000 touch panel devices have a controller which senses a switch closure on a transparent touch screen by switching current between X and Y axes of the touch screen. Current which has been passed through the various switches of the touch screen is converted to voltage and then from analog X/Y signals to digitial X/Y position coordinates. In such a membrane switch type device, the membranes are subject to scratching. Also, the multiple layers used in these devices tend to have a high reflectance, a relatively low light transmission and a relatively low resolution.

It is known to detect and to locate the touch of a touch panel by providing an array of optical sources and detectors about the periphery of the touch panel. Alternatively, an array of ultrasonic generators and ultrasonic detectors are provided about the periphery of the panel. In each instance, the sources and detectors are connected with an electronic system that responds to and locates the disturbance which touch causes in the signals delivered from the sources to the detectors.

Another capacitive touch detection device is disclosed in U.S. Pat. No. 4,476,463 of Ng, et al. This particular device utilizes an electrically conductive touch sensitive coated surface with four elongated electrodes connected to the coating, one electrode being provided along each side of the touch sensitive coating. As described in this patent, measurements are made of the change in electrical impedance which a capacitive touch introduces to a resistance-capacitance (R-C) circuit which includes the touch sensing surface. The impedance measurement examines the electrical time constant of the R-C circuit with the measurement being performed repeatedly from each end of each of two intersecting linear axes. The resultant four measures are combined to determine the position of the touch. In one embodiment set forth in this patent, an alternating current measuring signal is applied to an electrode and the voltage waveform generated in response to the applied signal is monitored at this electrode. The frequency of this measuring signal is varied until the monitored voltage waveform attains a selected condition. From the measuring signal frequency which yields the selected condition, a determination is made of the location of touch from the energized electrode. In another described embodiment, a direct current measuring signal having two successive selectively-timed values is applied to an electrode. The touch location relative to the energized electrode is determined from the voltage at the electrode resulting from the applied direct current signals. That is, the first measuring signal charges any capacitance coupled to the touch sensing coating, including the capacitance due to touch, to a known level. The second signal then partially discharges the capacitance through the resistance of the touch sensing coating. The voltage remaining on the electrode following this partial discharge identifies the location of touch from that electrode. The circuits described in the Ng, et al patent have certain undesirable complexities, such as the need to apply signals of varying frequencies or direct current signals of two successively-timed values.

Still another touch panel device with a touch sensing surface is disclosed in U.S. Pat. No. 4,353,552 of Pepper, Jr. In the Pepper device, a user touches the touch sensing surface with a finger (or other body portion) or an electrically conductive stylus. Plural terminations (i.e. the corners A, B, C and D) of the touch sensing surface are simultaneously driven to the same instantaneous potential by an oscillator. When the sensing surface is touched, currents flow through the driven terminations. The X and Y coordinates of touch are determined from these currents independently of the impedance of the user's touch. This approach suffers from inaccuracies in touch location determination and eliminates impedance information which can be useful in certain applications. In one embodiment, Pepper also utilizes pressure sensors, which, for example, sense pressure at a touched location in excess of a threshold. Upon such a determination, discrete action can be controlled, such as the firing of a gun during playing of video game.

Therefore, a need exists for an unpatterned touch panel which overcomes these and other disadvantages of the prior art.

SUMMARY OF THE INVENTION

A touch panel device according to the present invention detects touch, such as a touch by a human finger, which occurs anywhere on a touch sensitive surface of a touch panel. Circuitry is provided for determining the position of the touch on the touch sensing surface. The position or location of the touch is typically determined relative to an X-Y coordinate system with the location of the touch being accurately pinpointed.

In accordance with the invention, the touch locations are determined from touch currents generated by selectively applying alternating current voltage panel scanning signals to the touch sensing surface. In one scanning method, these panel scanning signals are applied so as to establish an alternating current voltage gradient in a first direction from a first side of the touch sensing surface to a second side of the touch sensing surface. When scanned in this manner and the touch sensing surface is touched by a user, a first touch current flows through the user and is detected. In addition, when a common alternating current voltage panel scanning signal is then simultaneously applied to both the first and second sides of the touch sensing surface, an impedance touch current flows through the user and is detected. The touch location along the first direction is determined from the detected first and impedance touch currents. Also, in accordance with this first embodiment, an alternating current voltage scanning panel signal may also be applied to the touch sensing surface so as to establish an alternating current voltage gradient in a second direction across the touch sensing surface from third to fourth sides of the surface. When the panel is touched, a second touch current signal flows and is detected. Typically, the first and second directions are normal to one another and correspond to an X-Y coordinate system. The touch location is then determined relative to this coordinate system from the first, second and impedance touch currents.

In an alternate scanning method, an alternating current voltage gradient is established in the first direction from the first to second sides of the sensing surface. This results in a first touch current when the touch sensing surface is touched. The gradient is also established in a direction opposite to the first direction from the second to the first sides so as to result in a second touch current. The location along the first direction, as well as the impedance touch current if desired, is then determined from the first and second touch currents. In this alternate approach, to obtain two dimensional touch location information, such as relative to an X-Y coordinate system, the voltage gradient is established in the second direction across the touch sensing surface from the third to the fourth sides. This results in a third touch current upon touch by a user. Also, the voltage gradient is established in the opposite direction from the fourth to the third sides so as to produce a fourth touch current. The touch location and the touch impedance current if desired, is then determined from the first, second, third and fourth touch currents.

As another feature of one embodiment of the invention, a transformer and switching circuit are used to selectively apply the panel scanning signals to the touch sensing surface. The resulting touch current signals are generated at the center tap of the transformer.

As more specific features of an illustrated embodiment of the present invention, a panel output signal processing circuit means is provided for processing the touch currents. This processing circuit means includes a synchronous rectifier circuit means for rectifying the touch currents in synchronization with the panel scanning signals applied to the touch sensing surface. An integrator circuit means integrates the rectified touch current signals over integration time periods in synchronization with the panel scanning signals. Also, an analog to digital converter means converts the integrated touch current signals to corresponding digital touch current signals and a processor circuit means determines the touch location from the digitized touch current signals.

As a further feature of the invention, the processor circuit evaluates the magnitude of digitized impedance touch current signals. The processor circuit also controls the integration time periods as required to adjust the magnitudes of the digitized impedance touch current signals to be above a minimum magnitude or within a desired range of magnitudes.

As a still further feature of the present invention, a nulling circuit is provided for nulling the touch currents at times when the touch sensing surface is untouched.

As another aspect of the present invention, the processor circuit repetitively determines touch locations from the touch currents generated when the touch sensing surface is touched and averages the touch locations so as to determine the touch locations as the average of the repetitively determined touch locations.

As still another feature of the present invention, changes in the impedance touch current signals which are unaccompanied by changes in other touch current signals may be monitored. Such changes in impedance touch current result from, for example, a user pressing harder, which increases the contact area of the user's finger, on the touch sensing surface without moving the location of touch. Upon such an occurrence, other functions may be controlled, such as the calling of a subroutine to process further information related to the touch location.

As another feature of the invention, each individual touch location may be determined by averaging a selected number of samples of the touch current signals. In accordance with this approach, an error signal may be generated in the event the touch current samples deviate from one another by more than a predetermined amount. Such a deviation indicates that the touch sensing surface is not being steadily touched by a user. The number of such samples which are averaged in determining an individual touch location is variable.

As still another aspect of the present invention, a no touch condition may be indicated in the event the magnitude of the impedance touch current signal is no greater than a threshold magnitude.

As a further aspect of the present invention, touch locations can also be determined when touch is by an electrically conductive stylus. Also, accurate touch location determination of touch by a gloved finger results when the glove is of an electrically conductive material, or, if not conductive, is sufficiently thin to allow measurable capacitive touch currents at the frequency of the panel scanning signals. Touching may also be by any other mechanism which permits such touch currents. When mentioned herein, touches by a gloved finger or by a stylus are to be understood as limited to touches by a glove or stylus of the type which allows such touch currents.

It is accordingly one object of the invention to provide an improved touch-responsive display device.

Still another object of the present invention is to provide improved circuitry and methods for locating the position at which a touch sensing surface of a touch panel is touched.

It is another object of the present invention to provide a touch panel device for locating touch on a touch sensing surface thereof with a relatively high degree of reliability and accuracy.

A further object of the present invention is to provide a touch panel device for locating touch on a touch sensing surface thereof whether touch is by a user's finger or other body part, by a user who is wearing a glove, or by a stylus.

Still another object of the present invention is to provide such a touch panel device which is durable, relatively easy and inexpensive to manufacture, and which is of reduced circuit complexity in comparison to other touch panel devices.

These and other objects, features and advantages of the present invention will become apparent with reference to the following description and drawings.

BRIEF DESCRIPTION OF THE DRAWINGS

FIG. 1 is a block diagram of one embodiment of a touch panel device according to the present invention;

FIG. 2 is a front elevational view of a touch panel in accordance with the present invention;

FIG. 5 is a timing diagram for the circuits of FIGS. 3 and 4;

FIG. 6 illustrates an alternate approach for applying panel scanning signals to a touch sensing surface;

DETAILED DESCRIPTION OF PREFERRED EMBODIMENTS

OVERALL DESCRIPTION

Figures 3, 3A:
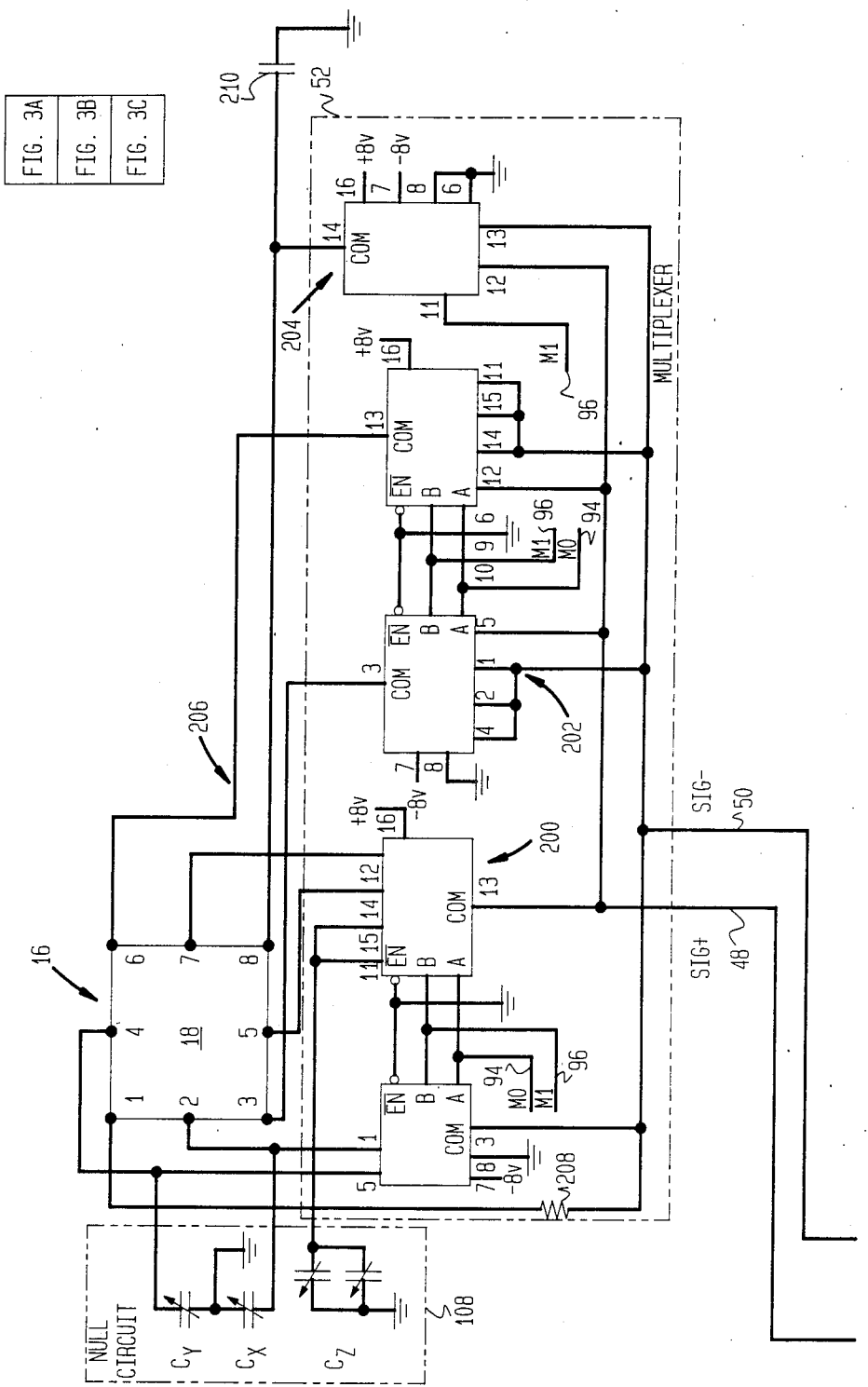
FIG. 3 is an electrical circuit schematic diagram of a portion of the touch locating circuit utilized in the embodiment of FIG. 1.
Figure 3B:
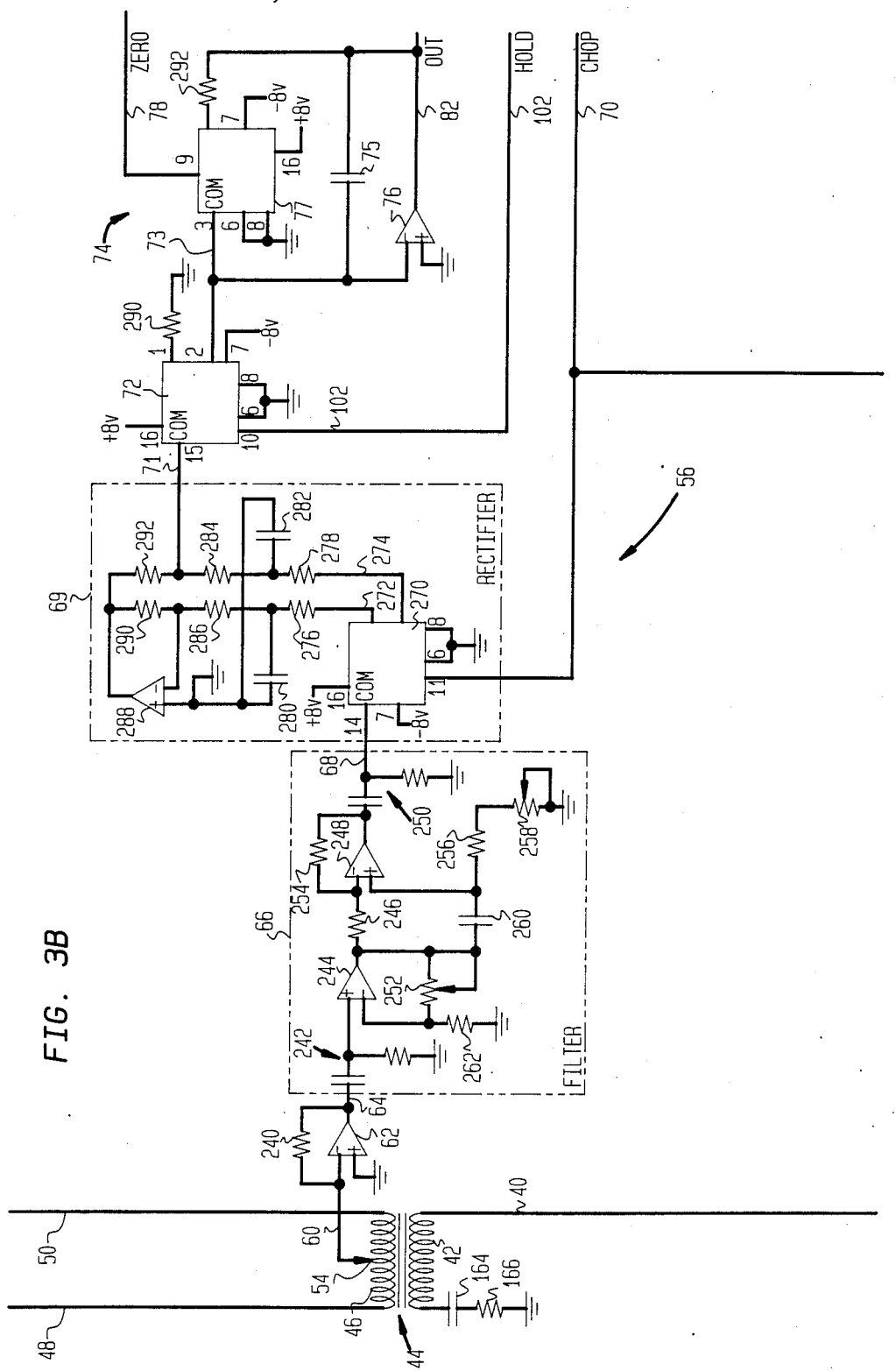

As shown in FIG. 1, a touch panel device in accordance with the invention has a display unit 12 with a display screen 14. The illustrated display unit comprises a cathode-ray tube computer terminal and accordingly the display screen 14 comprises the face of the cathode-ray tube. An optically-transparent touch panel 16 is positioned to overlay the screen 14 so that the screen is visible through the touch panel. By optically transparent, it is meant that it is possible to perceive images on screen 14 through the touch panel 16. In other applications, the display unit 12 is eliminated. For example, an information containing sheet of paper, such as a question and answer sheet, may be positioned underneath the touch panel 16 with the touch panel being utilized to enter data relating to the question and answer sheet. In certain applications, the touch panel 16 need not be transparent. For example, the touch panel may simply be used as a data entry pad with the location touched causing the entry of data into a computer or other device.

The touch panel 16 has a base plate, which may be of glass or other optically transmissive material, with an electrically-conductive coating 18 over its outer surface. The coating 18 may cover the entire display screen 14 when the touch panel is in place or whatever portion of the screen 14 which is used to display user-selectible items.

As shown in general in FIG. 2, and described in greater detail below, the coating 18 comprises a touch sensitive or sensing surface with plural electrical contacts or electrodes, in this case eight such contacts 1 through 8. A first set 22 of these contacts, that is contacts 1 through 3, are positioned in a row at one side of the touch sensing surface 18. A second set 24 of contacts, contacts 6 through 8, are positioned in a row at the opposite side of the touch sensing surface from the first set. That is, the first and second sets 22, 24 are in rows spaced apart from one another in a first direction across the surface 18. A third set 28 of such contacts, contacts 3, 5, and 8, are positioned along the lower or third side of the surface 18. In addition, a fourth set of such contacts, contacts 1, 4 and 6, are positioned along the fourth or upper side of the surface. Thus, the third and fourth sets of contacts are spaced apart from one another in a second direction across the touch panel surface.

More specifically, in the illustrated embodiment, the electrical contacts 1, 3, 6 and 8 at the respective corners of the panel are shared by more than one set. In addition, the contacts 2, 4, 5 and 7 are located intermediate to, and more specifically midway between, the respective corners. The contacts may comprise air dried silver contact paint spots, approximately 0.2 inches square. Respective leads are coupled to the contacts 1 through 8 and facilitate convenient electrical connection to the contacts. To provide strain relief, the portion of each of these leads adjacent its associated contact is secured, as by epoxy, to the edge of the touch panel base plate.

With this construction, the first and second sets of contacts are at the opposite horizontally separated peripheral side edges of the touch panel. The other sets 26, 28 of contacts are vertically spaced apart at opposite peripheral side edges of the touch panel. Although the contacts of each set do not necessarily have to be in a line, when colinear and when the first and second directions are normal to one another, they provide a reference coordinate system. Touch locations are determined relative to this coordinate system by the circuitry explained below. Moreover, when the touch panel is mounted and calibrated, the contacts are at known locations relative to the terminal screen 14. Therefore, by determining the location on the touch sensing surface 18, a corresponding determination is made of the location on the display terminal screen 14. It should be noted that the invention is not limited to this particular contacting scheme. FIG. 6 illustrates another example of a contact arrangement used to apply scanning signals to the sides 22, 24, 26 and 28 of the touch sensing surface 15. In the FIG. 6 form, five contacts are located along each side of the touch sensing surface.

The touch locating system illustrated in FIG. 2 utilizes the two pairs of opposed sets 22, 24 and 26, 28 in determining the touch location relative to the two directions across the touch sensing surface. Only one pair of opposed sets is used if single direction touch location determination is to be made. That is, sets 22 and 24 are used to determine touch location in the first direction. Also, sets 26 and 28 are used to determine touch location in the second direction.

With further reference to FIGS. 1 and 2, a function generator or signal source 30 generates an alternating current voltage touch panel scanning signal at an output 36. A driver amplifier 38 receives the panel scanning signal, amplifies this signal, and applies the resultant signal via an output 40 to the primary winding 42 of a touch panel driving transformer 44. This drives the secondary winding 46 of the transformer and establishes an alternating current voltage across the secondary winding between its signal plus (Sig+) output 48 and its signal minus (SIG−) output 50. A multiplexer or switching circuit 52 applies the panel scanning signals from outputs 48 and 50 of the secondary winding to selected sets or rows of the touch panel contacts as explained below. In response to these scanning signals, panel output or touch current signals are generated at the center tap 54 of the transformer 44 when the touch sensing surface is touched. These touch current signals are processed by a panel output signal processing circuit means 56 to provide an indication of the location of touch and other information.

In the illustrated panel output signal processing circuit 56, the touch current signals from center tap 54 are transmitted along a line 60 to a touch current sensing operational amplifier 62. The output of amplifier 62, corresponding to the touch currents at the center tap 54, is fed via an output line 64 through a filter 66 and then along a line 68 to a synchronous rectifier 69. Rectifier 69 receives synchronization or chop signals on a line 70 from the signal generator. The chop signals synchronize the rectification to the alternating current voltage signals generated by source 30 and applied to the touch sensing surface 18. The rectified touch current signals are transmitted along a line 71 to an integrator circuit 74 which integrates these signals. The integrator includes a switch 72 which is closed during integration time periods when signals are delivered to integrator circuit 74 for integration therein. The integrator circuit includes an integrating capacitor 75 in parallel with an integrating amplifier 76. In addition, an integrating capacitor discharge switch 77 is included within integrator 74 for selectively discharging integrating capacitor 75 in response to discharge signals on line 78. These discharge or integrator zero signals are generated as explained below. The integrated touch current signals are fed on a line 82 to an analog to digital converter 84 which digitizes these signals. The digitized signals are transferred along a line 86 to a microprocessor 88 which, among other functions, computes the touch location and other desired information from the touch current signals.

The microprocessor 88 interacts, such as via a line 90 with a computer 92 which is connected by a line 93 with the display terminal 12. For example, computer 92 may cause selected information to be displayed on the screen 14. Also, computer 92 may change the displayed information, as determined by software in the computer 92, depending upon the location on the touch sensing surface which is touched by the user. This is accomplished in a conventional manner to fit the desired application.

Control signals from the microprocessor 88 are transmitted at respective M0 and M1 outputs along lines 94, 96 to the multiplexer 52. These control signals control the multiplexer for routing the panel scanning signals to desired sets of contacts so as to generate touch current signals from which touch locations may be determined. Exemplary scanning sequences are discussed below.

The FIG. 1 panel output signal processing circuit 56 also includes a counter circuit 98, which may be microprocessor implemented, for controlling data transfers between the rectifier 69, integrator 74, analog to digital converter 84 and microprocessor 88.

Counter circuit 98 receives a start input signal along a line 100 from the microprocessor 88 at times when the touch locating determinations are desired. The counter circuit also generates the integration capacitor discharge signals on line 78 to discharge the integration capacitor 75 prior to each successive integration. Rectified touch current signals are transferred from rectifier circuit 69 to the integrator 74 at times when the counter circuit 98 generates a hold signal on a line 102. This hold signal closes switch 72 and couples the rectifier output to the integrating capacitor 75. Integration continues for the duration of the hold signal. The counter circuit 98 also has an input coupled to the signal generator synchronization signal output line 70 for synchronizing the counter circuit to the panel scanning signals applied to the touch sensing surface 18. The counter circuit is also coupled via a line 104 to the analog to digital converter 84 for purposes explained below.

More accurate determination of touch currents and touch locations result when the analog to digital converter is providing an output with a magnitude which is within a desired range. If too small, minor variations in touch currents can be overlooked and spurious signals have a greater impact. If too large, the analog to digital converter may overflow and provide an inaccurate touch current indication. To minimize such possibilities, microprocessor 88, as an optional feature, monitors the magnitude of the analog to digital converter output. When outside a desired range, microprocessor 88 transmits an integration timing control signal along a line 106 to the counter circuit 98. In response to such timing control signals, the counter circuit adjusts the duration of the hold signal, and thus the integration time period, until the analog to digital converter output is at the desired level. This facilitates the use of the touch panel device under widely varying conditions with accompanying widely varying touch currents, such as in situations in which a stylus is used to touch the touch sensing surface 18, an individual touches the touch sensing surface with a bare finger or other body part, or even if the individual touches the touch sensing surface with a gloved finger.

A nulling circuit 108 is utilized to adjust touch current signals at the center tap 54 to a null or zero value at times when the panel is not being touched. Consequently, the existence of currents at center tap 54, at least currents above a noise threshold level, indicate the presence of a touch.

Panel Scanning Sequences and Touch Location Determination

As explained in greater detail below, microprocessor 88 controls the multiplexer 52 so as to repetitively apply the transformer SIG+ and the SIG− outputs 48, 50 to selected sides of the touch sensing surface 18 in a predetermined sequence. From the resulting touch currents, the touch location and other information is determined.

As first specific example of a scanning sequence, and with reference to FIG. 2, assume that the touch currents have been adjusted to zero by nulling circuit 108 when the touch sensing surface is untouched. Also, assume that an X-Y coordinate system has been established with its origin at the center of the touch sensing surface. If a point P is touched, the location of this point is given by the coordinates X and Y as shown in FIG. 2.

In a first mode of this first scanning sequence, the SIG− output 50 is coupled to the set of contacts 22 and the SIG+ output 48 is coupled to the set of contacts 24. In addition, the contacts 4 and 5 are open circuited (although they need not be). In this mode, an alternating current gradient is established in a first or X direction across the touch sensing surface. In this case, the first direction is horizontal and comprises an X axis. The resulting first or X touch current is expressed by the following equation:

$$i_x = K_x X V/Z_t \quad (a)$$

In the above equation, $i_x$ is the resulting touch current, which may be designated as a first or X touch current. Also, V is the voltage at secondary winding output 48 relative to virtual ground at the center tap of the transformer. In addition, $Z_t$ is the impedance added to the circuit when a user touches the touch sensing circuit while $K_x$ is a constant. In addition, the quantity $V/Z_t$ is the impedance current that flows upon touch by a user. Finally, X is the X location of touch.

In a second mode of this first scanning sequence, the SIG+ output 48 is coupled to the first and second sides 22, 24 of the touch sensing surface and the center tap 54 is grounded through a capacitor having the same impedance as the untouched touch panel device. This establishes a uniform alternating current voltage in the first direction. In this mode, any touch current at the center tap 54 corresponds to the impedance touch current through the user. This impedance touch current $i_z$ may be expressed as follows:

$$i_z = V/Z_t \quad (b)$$

The above two equations may be combined to provide the following equation for the X location of touch:

$$X = \frac{i_x}{i_z K_x} \quad (c)$$

To determine $K_x$, one touches the touch sensing surface at known X locations. For example, at the four corners or at the far right and far left along the X-axis. By substituting the known X locations in formula (c) above and averaging the results, a value of $K_x$ can be determined. Once $K_x$ is determined, unknown X touch locations can be computed from the first and impedance touch current signals using the above equations.

Assuming two dimensional touch information is desired, the first scanning sequence includes a third mode in which the SIG+ output 48 is coupled to top side 26 of the touch sensing surface while the SIG− output 50 is coupled to the bottom side 28 of the touch sensing surface. This establishes an alternating current voltage gradient in the second or Y direction across the touch sensing surface. The resulting second or Y touch current, $i_y$ is expressed by the following equation:

$$i_y = K_y Y \frac{V}{Z_t} \quad (d)$$

In the above equation, Y is the Y location of touch. Also, $K_y$ is a constant which may be determined in the same manner as $K_x$ was determined above by touching the touch sensing surface at known locations. Combining formulas (b) and (d) above results in the following expression of Y location:

$$Y = \frac{i_y}{i_z K_y} \quad (e)$$

Thus, in the above manner the X and Y coordinates of touched location P can be determined from touch currents generated by scanning the touch sensing surface in the three modes described above. By repeating the scanning cycle a predetermined number of times and combining the results, as explained below, an accurate determination of touch position can be obtained. The switching of the scanning signals between the various modes is accomplished by multiplexer 52 under the control of M0 and M1 signals from the microprocessor 88. The location of touch on the touch panel 16 identifies, to the computer 92, which informational item being displayed on the terminal 12 has been selected by the user. The terminal 12 then responds in a known manner to this determination of user selection.

In addition to determining touch location, additional information may be obtained from the generated touch currents. For example, the X and Y coordinates may be computed at successive times with the impedance touch current $i_z$ also being monitored. If X and Y do not vary, but $i_z$ varies, this indicates that the user is continuing to touch a particular location on the touch sensing surface, but has changed the manner of touching this location. For example, the user may be pressing his or her finger harder at the touched location which thereby varies the area of the touch sensing surface which is touched. The resulting variation in impedance touch current can be used by computer 92 for additional functions. For example, if the touch screen is pressed at the same location, but only harder, the resulting change in impedance touch current $i_z$ is detected and can be used to call up a particular subroutine which operates on data identified by the touched location.

Another scanning sequence which provides desired X and Y touch currents, as well as impedance touch currents, is as follows. This second sequence involves scanning the touch sensing surface in four modes instead of the three modes previously described. With reference to FIG. 2, this scanning method is described with reference to touch point P located at $X_1$, $X_2$, $Y_1$ and $Y_2$ locations. That is, the total distance in the X direction across the touch sensing surface is known and given as the sum of $X_1$ plus $X_2$. Also, $X_1$ is the distance from the left side of the panel in FIG. 2 to point P while $X_2$ is the distance from the right side of the panel to point P. Moreover, $Y_1$ plus $Y_2$ is known and is the total distance in the Y direction across the panel. Also, $Y_1$ is the distance from the lower side of the touch sensing surface to point P while $Y_2$ is the distance from the upper side of the touch sensing surface to point P.

In the first mode of this second scanning sequence, the circuit is configured to couple the SIG+ output 48 to the right side of the touch sensing surface while the center tap 54 is coupled to the left side of the touch sensing surface. This establishes an alternating current voltage gradient across the touch sensing surface in the X direction from right to left. Under these conditions, and assuming the nulling circuit has been adjusted to null the touch currents to zero when the touch sensing surface is untouched, a first touch current $i_{x1}$ at the center tap is expressed as follows:

$$i_{x1} = K_x \frac{X_1}{X_1 + X_2} \frac{V}{Z_t} \qquad (f)$$

In addition, when in a second mode, the SIG+ output 48 is applied to the left side of the touch sensing surface and the center tap 54 is coupled to the right side of the touch sensing surface. This also establishes an alternating current voltage gradient established in the X direction, but from left to right. In this case, a second touch current $i_{x2}$ is expressed by the following formula:

$$i_{x2} = K_x \frac{X_2}{X_1 + X_2} \frac{V}{Z_t} \qquad (g)$$

When formulas (f) and (g) are added, the impedance touch current $i_z$ is given as follows:

$$K_x(V/Z_t) = (i_{x1} + i_{x2}) = i_z \qquad (h)$$

Finally, combining formulas (f) and (h) results in the following expression for $X_1$, the X-axis position of touch point P:

$$X_1 = \frac{i_{x1}(X_1 + X_2)}{K_x(i_{x1} + i_{x2})} \qquad (i)$$

In the above equations, $K_x$ is a constant and can be determined in the same manner as explained above by touching the touch sensing surface at known locations. In addition, as previously mentioned, the sum $X_1$ plus $X_2$ is known. Therefore, from the above two measurements, X-axis position information for touch point P can be derived along with information concerning changes in the impedance touch current $i_z$.

The Y-axis position information is determined in the following manner. In the third mode of this scanning sequence, the SIG+ output 48 is coupled to the top side of the touch sensing surface while the center tap 54 is coupled to the bottom side of the touch sensing surface. The resulting third touch current $i_{y1}$ is expressed as follows:

$$i_{y1} = K_y \frac{Y_1}{Y_2 + Y_1} \frac{V}{Z_t} \qquad (j)$$

In the fourth mode, the SIG+ output 48 is coupled to the bottom side of the touch sensing surface while the center tap is coupled to the top side of the touch sensing surface. This results in a fourth touch current $i_{y2}$ expressed by the following equation:

$$i_{y2} = K_y \frac{Y_2}{Y_2 + Y_1} \frac{V}{Z_t} \qquad (k)$$

By combining formulas (j) and (k), the following expression of impedance touch current $i_z$ is obtained:

$$K_y(V/Z_t) = (i_{y1} + i_{y2}) = i_z \qquad (l)$$

Furthermore, when formulas (j) and (l) are combined, an equation for $Y_1$ is obtained:

$$Y_1 = \frac{i_{y1}(Y_1 + Y_2)}{K_y(i_{y1} + i_{y2})} \qquad (m)$$

As explained above, the sum $Y_1$ plus $Y_2$ is known. In addition, the constant $K_y$ can be determined in the same manner as the constant $K_x$, as previously explained.

Thus, the $X_1$ and $Y_1$ positions can be obtained from the touch currents. In addition, changes in the impedance touch current can be monitored as desired.

As will be apparent to those skilled in the art, other scanning sequences and modes of establishing alternating current gradients across the touch sensing surface may be employed to generate the touch currents from which the desired location information can be determined.

Touch Panel Structure

Again referring to FIG. 2, the touch panel 16 has a touch sensitive surface 18 which extends across the area thereof which, in conjunction with a location determination circuit, is used to sense touch by a user. As previously mentioned, the touch panel 16 includes a base plate coated on a surface 18 with an electrically conductive film. One suitable example of such a film is indium tin oxide (10% indium, 90% tin oxide) having a sheet resistivity of 200 ohms per square and a transmission of 85% for light at 520 nanometers. Such plates are commercially available, such as from Optical Coating Laboratory (OCLI) of Santa Rosa, Calif. The sheet resistivity of the film is not highly critical with resistivities of 200 to 2,000 ohms per square, or higher, being suitable. However, sheet resistivities of significantly below 200 ohms per square tend to result in drive currents of larger than desired magnitudes.

The base plate is not limited to any particular shape. Thus, it may be circular, concave, spherical, curved or flat to fit the screen 14. In addition, the base plate may be opaque or optically transparent and of a variety of suitable materials. To reduce glare from reflected light from background sources, the base plate may be of a commercially available anti-glare glass. This glass may also be flat or contoured to match the curvature of the display screen. One source of such base plates is Eagle Convex Glass Co. of Charlesburg, W.V.

As previously mentioned, the particular contacting scheme employed may be varied as exemplified by the approaches shown in FIGS. 2 and 6. Of course, the multiplexer or switching circuit 52 employed will vary depending upon the contacting arrangement which is chosen. In general, any contacting arrangement which facilitates the establishment of a relatively uniform alternating current voltage gradient across the touch sensing surface in the desired directions may be employed.

Touch Panel Excitation Circuitry

The details of the circuitry utilized for generating and applying alternating current voltage signals to the touch sensing surface 18 are shown in FIG. 3.

More specifically, in the illustrated form, signal generator 30 includes a conventional sine wave signal source 120 such as an integrated circuit ICL 8038 source connected as shown in FIG. 3. Source 120 provides a sine wave output at pin 2. The pin 2 output is filtered and then amplified by an operational amplifier 122 to provide a sine wave output with a stable amplitude at output 36 of signal generator 30. A switch 124 couples a selected capacitor to pin 10 of source 120 and, together with the setting of a pair of ten kilohm potentiometers 126, 128, determines the frequency of the sine wave output. One suitable operating frequency is 200 kilohertz. Although not critical, the circuit is typically operated at a signal generator output frequency of from 15 kilohertz to 300 kilohertz. The signal source 120 also provides a square wave signal at pin 9 which is amplified and inverted by inverter 126 to provide the synchronization or chop signals at output line 72 for purposes explained below.

The illustrated driver amplifier circuit 38 includes an operational amplifier 156 with a discrete push-pull follower circuit 158. A ten kilohm bias potentiometer 160 is adjusted to reduce crossover distortion of the follower. A ten kilohm potentiometer 162 is also included to provide feed forward compensation for the driver amplifier circuit. The output of driver amplifier 38 is coupled via line 40 through the primary winding 42 of transformer 44 and through a 47 microfarard nonpolar electrolytic DC blocking capacitor 164 and a ten ohm resistor 166 to ground. Capacitor 164 prevents the transformer 44 from being driven into satuation by DC currents. Typically, the signal generator and driver amplifier combination drives transformer 44 so as to provide an approximately 10 volt peak to peak voltage across the secondary windings 48, 50 of the transformer.

In the preferred form, transformer 44 has a toroidal core. The transformer isolates current used to drive the touch sensitive surface 18 from the current generated by the signal generator 30. Consequently, the only currents appearing at the center tap 54 are touch currents. With such a transformer driving configuration, circuit complexities associated with subtracting panel scanning signal currents from touch currents are eliminated.

Suitable resistors and capacitors utilized in the signal generator and driver amplifier circuits which have not been mentioned above are set forth in Table I at the end of this detailed description.

Figure 4:
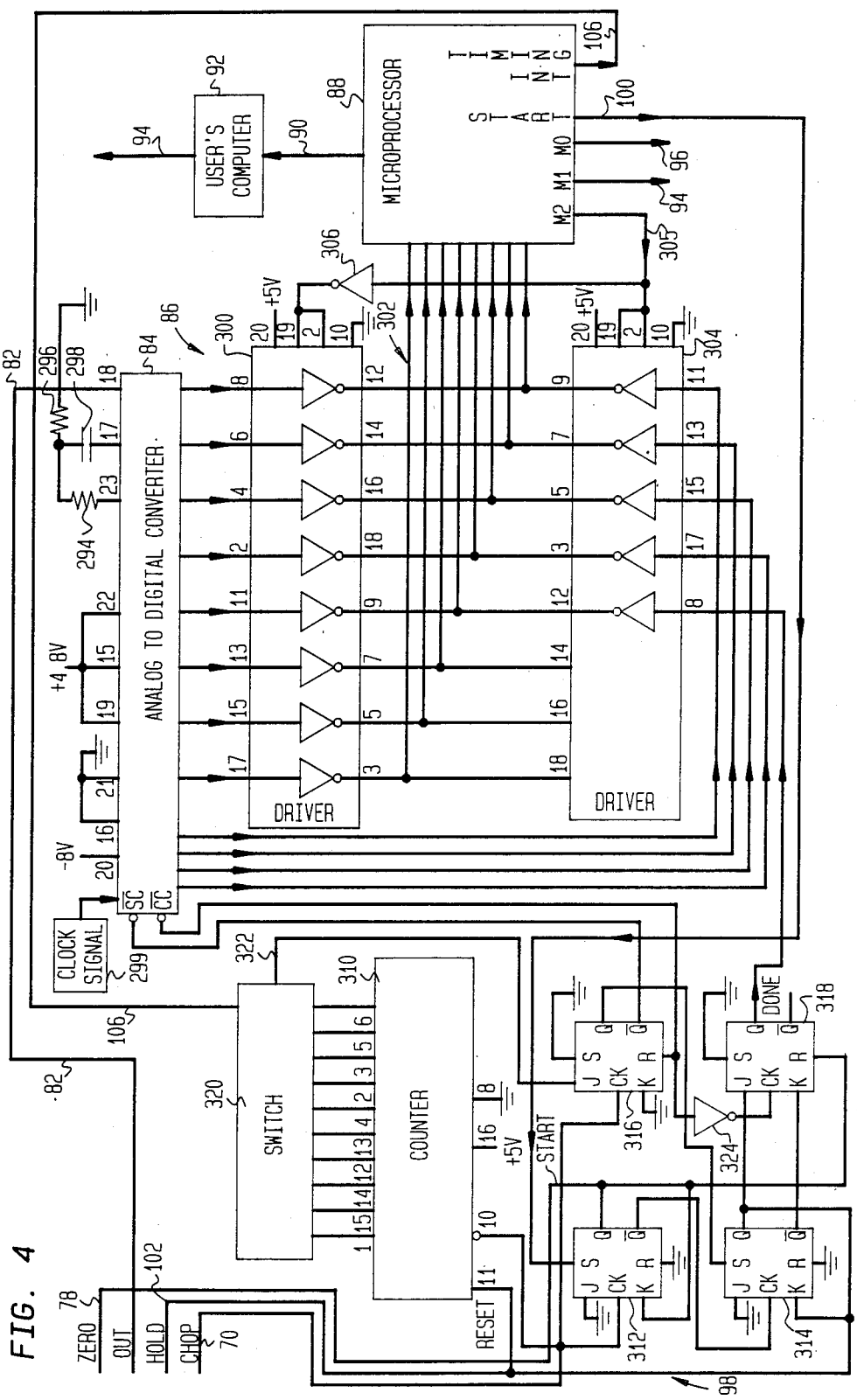
FIG. 4 is an electrical circuit schematic diagram of another portion of the touch locating circuit utilized in the embodiment of FIG. 1.

Multiplexer 52 comprises a switching circuit for applying the panel scanning signals to the touch sensing surface so as to establish the alternating current voltage gradients in the desired directions across this surface. With the illustrated touch contacting arrangement, multiplexer 52 comprises a pair of four channel CMOS CD4052 analog multiplexers 200, 202 together with a CMOS two channel multiplexer 204 (one third of a CD4053 multiplexer) interconnected as shown. The scanning signals at the SIG+ output 48 and the SIG− output 50 are delivered to scanning inputs of the multiplexer circuit 52. In general, the multiplexer circuits 200, 202 and 204 are toggled to various states by control signals M0 and M1 delivered to these circuits on control lines 94, 96 from the microprocessor 88 (FIGS. 1 and 4). The multiplexer input/output lines, designated generally as 206 in FIG. 3, are coupled to the respective contacts 1 through 8 of the touch sensing surface 18 as shown in FIGS. 2 and 3.

When logic zero signals are applied to both control lines 94, 96 by the microprocessor, the switching circuits assume a zero or X touch current determination state. When in this zero state, the contacts 1, 2 and 3 of set 22 are electrically tied together and the contacts 6, 7 and 8 of set 24 are electrically tied together. In addition, the contacts 4 and 5 are open. Also, when in the zero state, the SIG+ output 48 is applied to the contacts 1, 2 and 3 of the first set 22. In addition, the SIG− output 50 is applied to the contacts 6, 7 and 8 of the set 24. Under these conditions, an alternating current voltage gradient is established in the first or X direction across the touch sensing surface.

In addition, when the M0 control signal delivered on control line 94 is a logic zero and the M1 control signal on control line 96 is a logic one, the multiplexer is in a one or Y touch current determination state. In this state, contacts 1, 4 and 6 of set 26 are tied together and to the SIG+ output 48. In addition, the contacts 3, 5 and 8 are tied together and to the SIG− output 50. Furthermore, the contacts 2 and 7 are open. Under these conditions, an alternating current gradient is established between the top and bottom sets or rows of contacts in a second or Y direction across the touch sensing surface.

The multiplexer is in a two or impedance touch current determination state when the M0 control signal is a logic 1 and the M1 control signal is either a logic zero or logic one. When in this state, the four corner contacts, (contacts 1, 3, 6 and 8) are electrically tied together and to the SIG+ output 48. Simultaneously, the SIG− output 50 is tied to a nulling capacitor $C_z$ for purposes explained below. Also, the remaining contacts 2, 4, 5 and 7 are opened. Under these conditions, the alternating current voltage is simultaneously applied to all of the sides of the touch sensing surface. As a result, any touch current which flows at the center tap 54 corresponds directly to the impedance current generated when the touch sensing surface 18 is touched by a user. Of course, other contacts may be energized with the goal being the establishment of a uniform alternating current voltage field throughout the touch sensing surface.

The nulling circuit 108 includes a first or X touch current variable nulling capacitor $C_x$ coupled between touch panel contact 2 and ground and a second or Y touch current varible nulling capacitor $C_y$ coupled between the fourth touch panel contact and ground. The capacitors $C_x$ and $C_y$ are typically 22 picofarads. In addition, $C_z$ comprises a pair of parallel variable nulling capacitors, for example a 180 picofarad capacitor and a 65 picofarad capacitor connected between pins 11 and 15 of switching circuit 200 and ground. Assume the touch sensing surface is being scanned by shifting the multiplexer 52 through the various states. In this case, the capacitors $C_x$, $C_y$ and $C_z$ are adjusted until no touch current signals are generated at the center tap 54 of transformer 44 when the panel is not being touched.

In general, $C_z$ is adjusted to adjust the impedance touch current to zero when the panel is untouched and the multiplexer is in the second or impedance touch current determination state. When the total stray capacitance on the touch panel and $C_z$ are equal, no current flows through the connection at the transformer center tap 54 to virtual ground when the panel is untouched. That is, the center tap current for the second multiplexer state is a function only of the touch impedance, since there is no voltage change with changes in touch location. In addition, $C_x$ and $C_y$ are similarly adjusted to yield center tap nulls for the zero or X touch current determination and first or Y touch current determination multiplexer states. Capacitor $C_x$ adjusts the first or X touch current without any significant effect on either the second or Y touch current or the impedance touch current. That is, $C_x$ is tied to the X-axis where Y=0 and thus does not effect Y touch current. Similarly, $C_y$ adjusts the second or Y touch current without having any significant effect on the other touch currents. That is, $C_y$ is tied to the Y-axis where X=0 and thus does not effect X touch current. When the multiplexer is in the zero and first states, the center tap currents are functions of touch location and impedance. When nulled for all three states, the current flows from the center tap 54 only when the touch sensing surface is touched. By providing this nulling circuit, the touch currents may be readily nulled despite variations in impedance due to, for example, the manner in which a particular touch panel is mounted to a display terminal.

Incidentally, an 82 ohm resistor 208 is connected in series between the SIG− output 50 and the first contact of touch sensing surface 18. This resistance is approximately equal to the resistance provided through the switching circuits 200, 202 and 204 to the other contacts of the touch sensing surface. In addition, a 4.7 picofarad capacitor 210 is coupled between touch sensing surface contact 8 and ground to provide an offset in a direction which enables the nulling circuit to operate to null the first, second and impedance touch current signals under untouched conditions.

In operation, the microprocessor 88 repeatedly cycles the scanning of the touch panel 16 by shifting the multiplexer from the second to first to zero states. The resulting touch current signals are then combined pursuant to the equations (a) above to determine the touch location. Typically, the multiplexer cycle for scanning through all three states is extremely rapid (200 to 1,000 hertz). However, the slower the multiplexer frequency, the longer it takes the processing circuitry to determine a touch location.

In a similar manner, if desired to generate the four touch currents $i_{x1}$, $i_{x2}$, $i_{y1}$ and $i_{y2}$ as explained above in connection with equations (f)–(m), a multiplexer is employed and connected to apply panel scanning signals to the touch sensing surface as required to generate these respective touch currents. In addition, with the FIG. 6 configuration, a 20 wire multiplexer 52 is employed to accomplish scanning.

Figure 10:
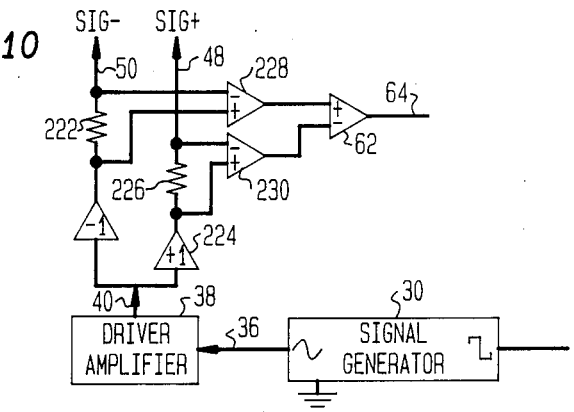
FIG. 10 is an electrical circuit schematic diagram of an alternate circuit for generating panel scanning signals for the touch sensing surface.

Although a transformer driven touch sensing surface simplifies the circuitry and provides other advantages, and is preferred, other circuits for establishing the desired alternating current voltage gradients across the touch sensing surface may be employed. One such circuit is shown in FIG. 10. In the FIG. 10 circuit, a sinusoidal output on line 40 is fed through a unity gain inverting operational amplifier 220 and a resistor 222 to the SIG− output 50. Simultaneously, the output at 40 is fed through a unity gain non-inverting operational amplifier 224 and a resistor 226 to the SIG+ output 48. The inverter side of resistor 222 is connected to the noninverting input of a differential amplifier 228 while the other side of resistor 222 is connected to the inverting input of this amplifier. The output of amplifier 228 is connected to the noninverting input of the touch current sensing amplifier 62. In the same manner, the amplifier side of the resistor 226 is connected to the noninverting input of a differential amplifier 230 while the other side of resistor 226 is connected to the inverting input of this amplifier. The output of amplifier 230 is connected to the inverting input of the touch current amplifier 62. When the touch panel is untouched, and the nulling circuit 108 has been properly adjusted, the output 64 from the touch current sensing amplifier 62 of FIG. 10 is zero. However, when the touch sensing surface is touched, touch current signals will be present at output 64 and can be used, as explained above, to determine the touch location.

Panel Output Signal Processing Circuit

Referring again to FIG. 3, the touch current sensing amplifier 62 has its inverting input connected to the center tap 54 of the transformer 44. The noninverting input of amplifier 62 is grounded. In addition, a one kilohm feedback resistor 240 is connected between the output 64 and inverting input of amplifier 62. When connected in this manner, amplifier 62 provides an output 64 corresponding to the currents flowing to the transformer center tap 54 and thus to the first, second and impedance touch currents.

These touch current signals are filtered by a filter circuit 66. More specifically, the touch current signals pass through a first three kilohertz passive high pass filter 242 to the noninverting input of a first operational amplifier 244. The output of amplifier 244 passes through a 10 kilohm resistor 246 to the inverting input of a second operational amplifier 248. The amplifier 248 is coupled through a second three kilohertz passive high pass filter 250 to the filter output 68 and then to the input of the rectifier circuit 69. Each of the filters 242, 250 combines a 0.1 microfarad blocking capacitor with a 5.1 kilohm resistor. A ten kilohm feedback potentiometer 252 is connected between the output of amplifier 244 and its inverting input and is used to adjust the gain of the filter. Also, a one kilohm resistor 262 is connected between the inverting input of amplifier 244 and ground. A ten kilohm feedback resistor 254 is also provided between the output and inverting input of the amplifier 248. The noninverting input of amplifier 248 is connected through a one kilohm resistor 256 and a 100 kilohm potentiometer 258 to ground. In addition, an 82 picofarad capacitor 260 couples the output of amplifier 244 to the noninverting input of amplifier 248. By adjusting potentiometer 258, the phase of the signal passing through the filter is adjusted to maximize the output at 68.

The touch current signals from filter 66 are rectified within rectifier 69 to provide rectified touch current signal outputs at line 71 to the integrator circuit 74. In the illustrated form, the rectifier 69 includes a CD4053 multiplexer or switch 270 connected to switch the incoming signals from filter 66 between respective inverting and noninverting output paths 272, 274. Switching occurs in response to the synchronization or chop signals on line 70. Each of these output paths includes a 3 kilohertz low pass passive filter comprised of respective 10 kilohm resistors 276, 278 and 0.01 microfarad capacitors 280, 282 connected as shown. The filters remove noise at frequencies where the phase of the inverting and noninverting paths do not match. The noninverting signal path 274 passes from the switch 270 through the resistor 278 and a 10 kilohm resistor 284 to the rectifier output 71. The inverting signal path passes through the resistor 276 and a 10 kilohm resistor 286 to the inverting input of an operational amplifier 288. The noninverting input of amplifier 288 is grounded. In addition, a 10 kilohm feedback resistor 290 is coupled between the output of amplifier 288 and its inverting input. The output of amplifier 288 is also coupled through a 10 kilohm resistor 292 to the rectifier output 71. The resistor 292 reduces the gain of the path through amplifier 288 so that signals traveling along the inverting path have the same relative magnitude as the signals traveling along the noninverting path 274. The output 71 of the rectifier 69 comprises a DC current which corresponds to the touch current signals at center tap 54.

Referring now to FIGS. 3, 4 and 5, the rectifier output is fed to a switch 72 within integrator 74, such as a CD4053 multiplexer connected as shown in FIG. 3 with a 100 ohm resistor 290 connected from pin 1 of this circuit to ground. Whenever a logic zero hold signal is applied on line 102 to the switch 72, the switch closes and the rectifier output is coupled to the integrating capacitor 75. The signals from the rectifier are integrated for an integration time period having a length which is determined by the duration of the hold signal. Typically, integrating capacitor 75 comprises a 0.033 microfarad capacitor connected from the inverting input of integrator amplifier 76 to the amplifier output. The noninverting input of amplifier 76 is grounded. In addition, switch 77 may comprise another CD4053 multiplexer which is connected as shown in parallel with the capacitor 75 and which has a 100 ohm resistor 292 connected between the amplifier output side of the capacitor circuit and the switch. In response to logic one signals on line 78, which occur just prior to the hold signal and accompanying integration, the switch 77 is closed to discharge the integrating capacitor 75. The 100 ohm resistor 292 limits the maximum discharge current. The output from integrator circuit 74 is a positive or negative analog voltage which corresponds to an integrated analog version of the touch currents generated at the center tap 54 of the transformer 44.

The output 82 of the integrator circuit is transmitted to an input of analog to digital converter 84 (FIG. 4), which may comprise an ADC 1211 circuit having a 12 bit output. The values of the resistors and capacitors coupled to the analog to digital converter 84 are listed in Table I. A clock 299 provides clocking signals for analog to digital converter 84. The analog to digital clocking frequency is greater than the chop signal frequency, with an exemplary frequency being 200 kilohertz.

The first 8 bits of the analog to digital converter output are fed to 8 inputs of a first line driver 300, such as a 74C244 line driver circuit. The corresponding 8 outputs of line driver 300 are connected to respective microprocessor inputs indicated generally at 302. The last four bits of the analog to digital converter output are coupled to four inputs of another similar line driver 304. The corresponding outputs of line driver 304 are connected via 4 of the inputs 302 to the microprocessor. In addition, driver 304 receives a "done" signal from counter circuit 98 following the completion of an integration cycle and the resultant digitization of the integrated signal. This done signal is also coupled by driver 304 to one of the microprocessor inputs 302. This enables the microprocessor to monitor the completion of an integration and digitization sequence.

Microprocessor 88 generates a logic zero signal at an M2 output 305, which is inverted by inverter 306 and applied to driver 300 at times when data is to be obtained from this driver. In addition, the M2 output is a logic one at times when data is to be obtained from driver 304.

As shown in FIG. 4, one form of counter circuit 98 includes a binary counter 310, such as a CMOS CD4040 12-stage-ripple-carry binary counter/divider together with four J-K flip-flops 312, 314, 316 and 318 interconnected as shown. In addition, the counter circuit includes an optional integration timing control switching circuit 320, which may comprise another CMOS multiplexer. Switching circuit 320 operates in response to integration timing signals on line 106 from the microprocessor 88 to control which of the pins 1–6 and 12–15 of counter 310 are interconnected. Line 106 typically comprises a plural wire cable for transmission of multiplexer control signals from the microprocessor to the multiplexer. This controls the duration of hold signals on line 102 and the integration time periods.

To perform a single integration cycle, microprocessor 88 generates a positive start signal on line 100 (See FIG. 5). This start signal is applied to the set input of flip-flop 312 and immediately causes the Q output of this flip-flop to become a logic one. This Q output appears on line 78 as a zero signal. As previously explained in connection with FIG. 3, this zero signal closes the discharge switch 77 within integrator 74 and discharges the integrating capacitor 75 immediately prior to the integration.

Simultaneously, a logic zero $\overline{Q}$ output of flip-flop 312 is applied to the clocking input of flip-flop 314. At the next positive going edge of a chop signal following the end of the start signal, the flip-flop 312 changes state with its Q output and the zero signal returning to a logic zero level. This opens switch 77 and sets the integrating capacitor 75 in condition for integration. With this change in state, the $\overline{Q}$ output of flip-flop 312 becomes positive and a positive going clocking signal is applied to the clocking input of flip-flop 314. In response to this clocking signal, the Q output of flip-flop 314 drops to a logic zero and constitutes the hold signal on line 102. While the hold signal is low, switch 72 is closed and integrator 74 integrates the output signal from the rectifier circuit 69.

Integration continues until counter 310 counts the number of chop cycles corresponding to the integration time period selected by the switch 320. When this occurs, a logic one $Q_n$ signal appears on line 322 from switch 320 and at the J input to flip-flop 316. At the next positive going edge of the chop signal, the $\overline{Q}$ output of flip-flop 316 goes to a logic zero and is applied to the $\overline{SC}$ input of the analog to digital converter 84. This starts the analog to digital conversion of the voltage signal stored by integrating capacitor 75. Thereafter, the $\overline{CC}$ output of analog to digital converter 84 goes to a logic one, is inverted by an inverter 324, and applied to the clock input of flip-flop 318. At the completion of the analog to digital conversion, the $\overline{CC}$ signal goes to a logic zero and, because of inverter 324, a positive going clocking signal is applied to flip-flop 318. This results in a positive "done" signal at the Q output of flip-flop 318 and indicates to the microprocessor that the analog to digital conversion is complete. Upon detection of this "done" signal, the microprocessor obtains the digitized touch current value from the appropriate driver outputs and utilizes this value in computing the touch location.

A two's complement approach is used in conjunction with digitization of negative values from the integrator. From the sign of the digitized value, the quadrant of the touched location P is determined. For example, with an X-Y coordinate system having an origin at the center of the touch sensing surface, negative X touch current values indicate touches to the left of the origin while positive X touch current values indicate touches to the right of the origin. Similarly, negative Y touch current values indicate touches below the origin while positive Y touch current values indicate touches above the origin.

The integration cycles are repeated, with the microprocessor shifting the multiplexer 52 (FIG. 3) through its respective states, to obtain successive digitized first, second and impedance current values.

Touch Current Processing

Figure 7:
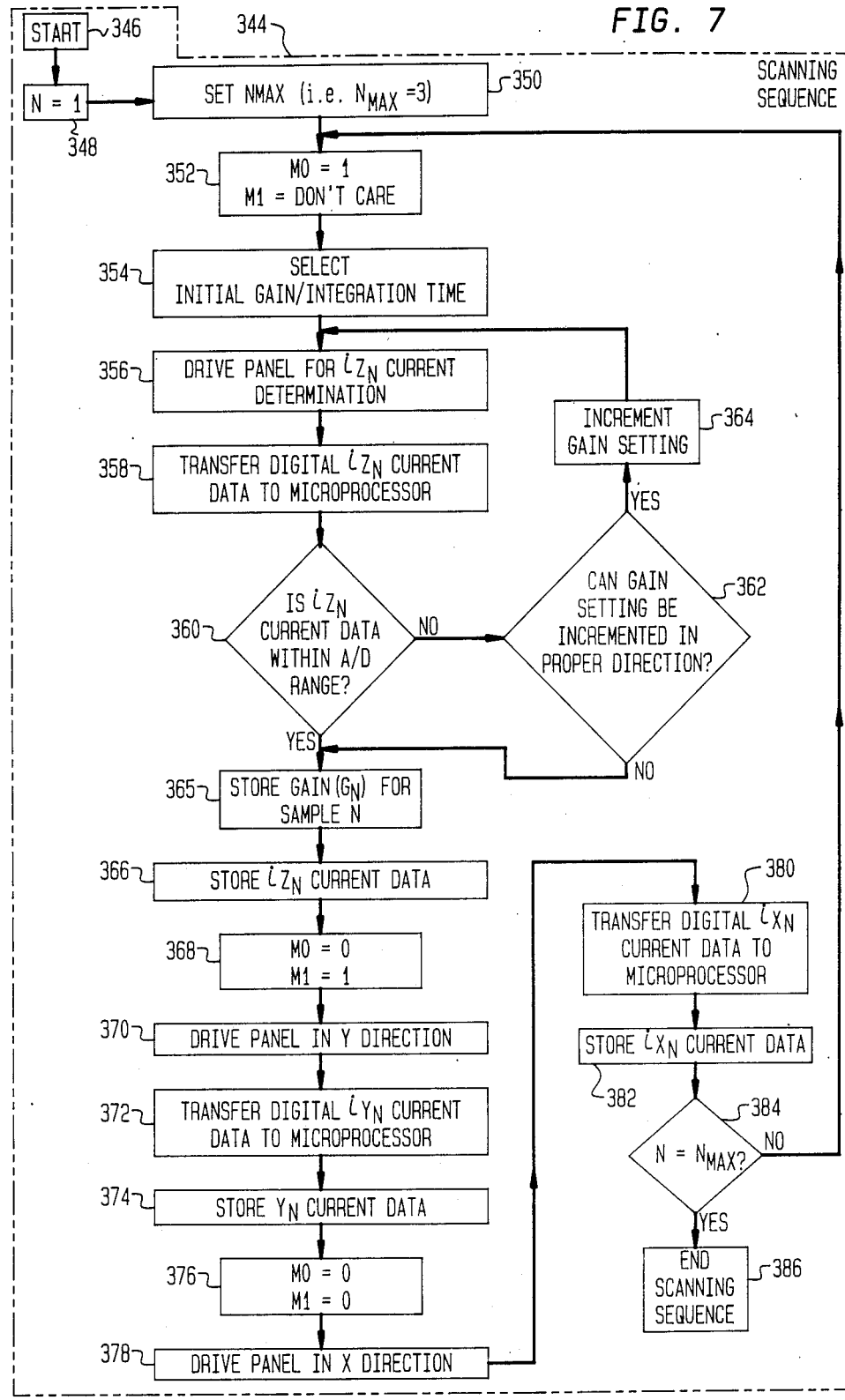
FIG. 7 is a flow chart of one touch panel scanning sequence utilized by the microprocessor of FIG. 1.
Figure 8B:
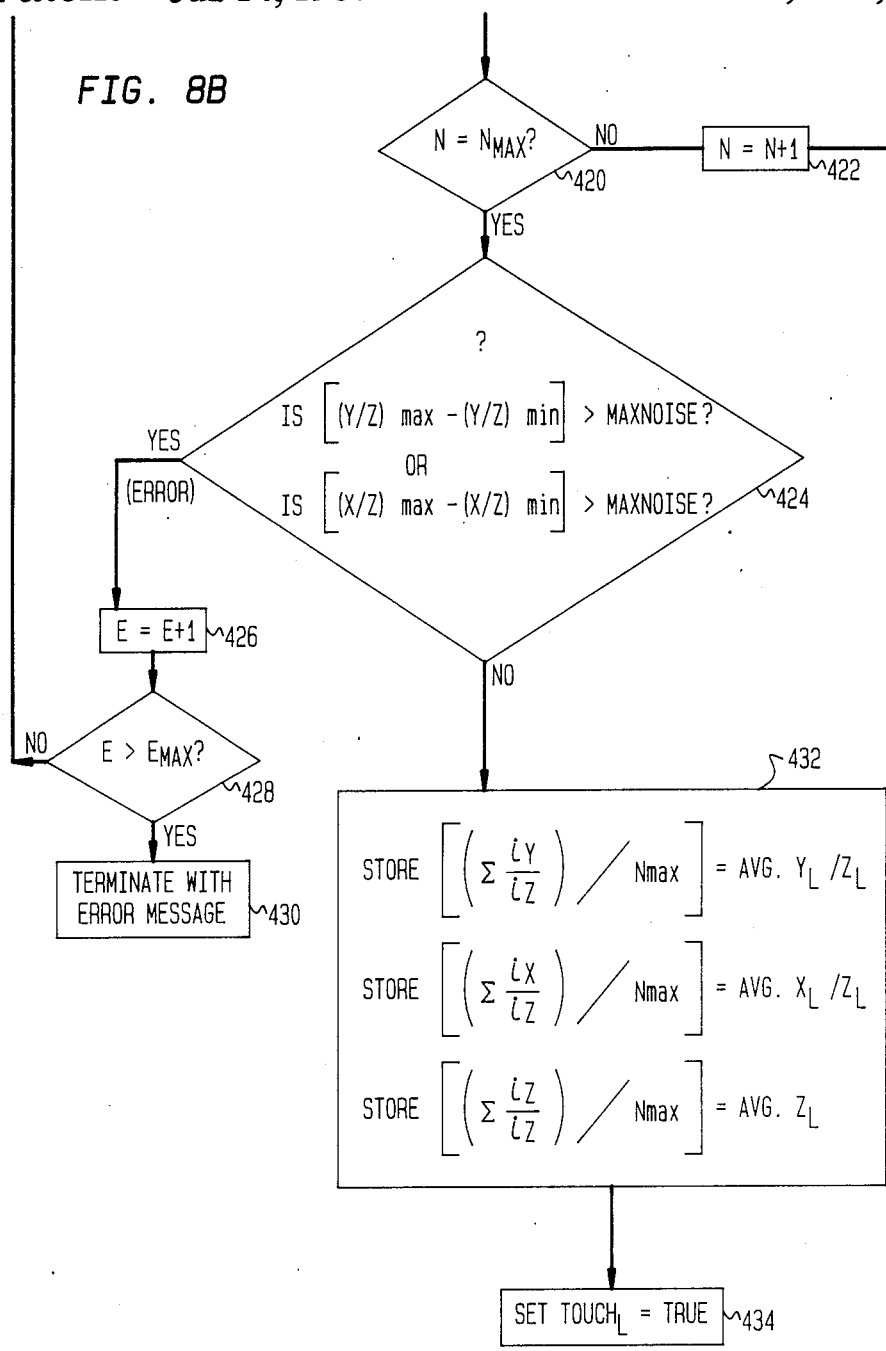
FIG. 8 is a flow chart of a touch location determining sequence utilized by the microprocessor of FIG. 1.
Figure 9:
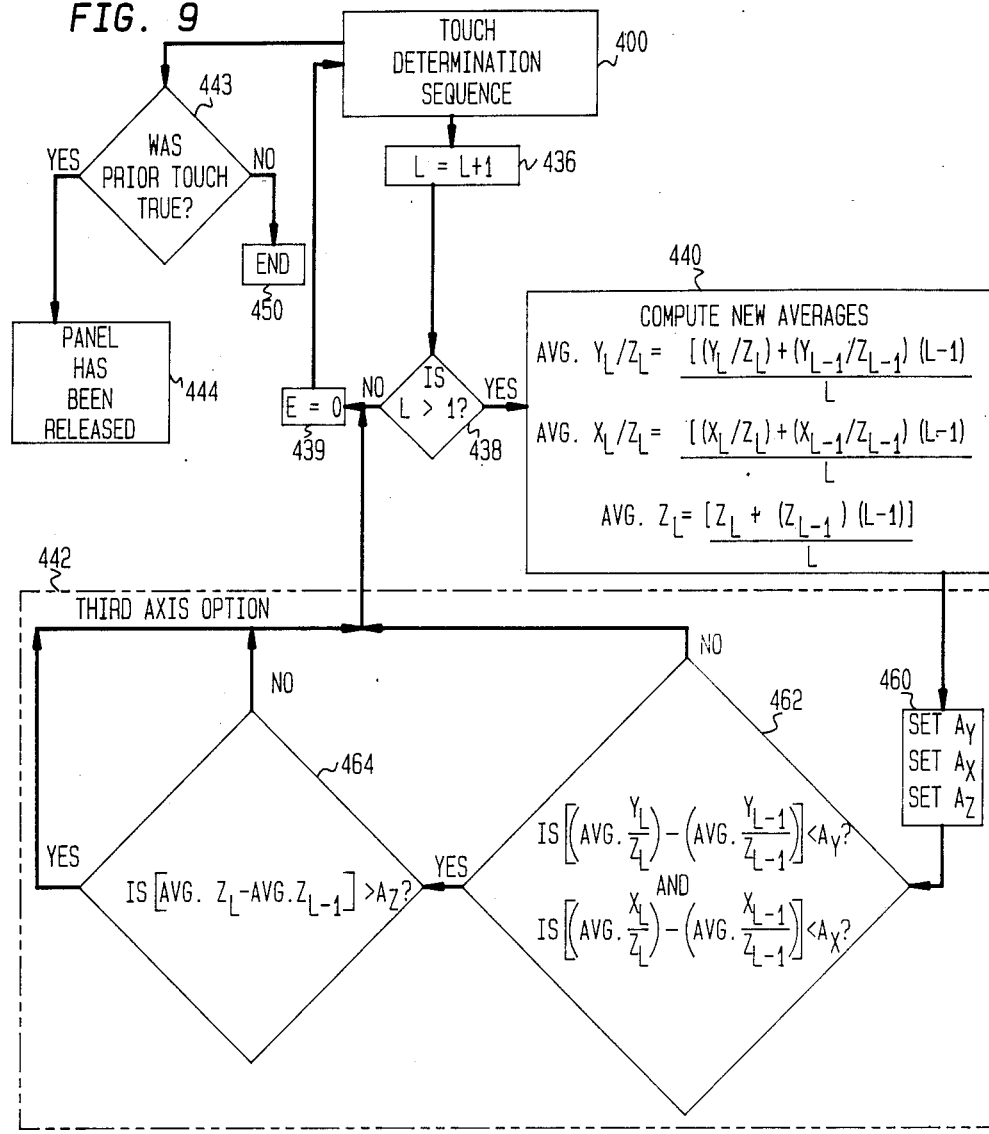
FIG. 9 is a flow chart of an optional sequence which averages touch location determinations and which is utilized in evaluating changes in impedance touch current which are unaccompanied by changes in other touch currents.

The flow charts of FIGS. 7, 8 and 9 illustrate one suitable sequencing operation for the touch panel scanning utilized in the FIG. 1 embodiment, together with one method in which the digitized touch current values are processed by the microprocessor 88.

The scanning sequence 344 of FIG. 7 corresponds to the scanning sequence utilized to generate the first, second and impedance touch currents explained above in connection with equations (a)-(e).

Initially, the scanning sequence commences at a start block 346 followed by a block 348 at which an integration sample number is initially set equal to one. From block 348, a block 350 is reached. In accordance with this sequence, at a block 350 a value of N max is established. N max is selectible, variable and corresponds to the number of first, second and impedance touch currents which will be averaged and used in making one touch location computation. Thus, N max corresponds to the number of multiplexer cycles between the zero, first and second states used in making such a computation. As an example, N max may be set equal to three. From block 350, a block 352 is reached and the M0 control signal is set equal to a logic 1 and the M1 signal is at either a logic one or a logic zero level. This is the impedance touch current determination or second state. In this state, an alternating current voltage signal (i.e. the SIG+ output 48) is simultaneously applied to a number of touch sensing surface contacts while the SIG− output 50 is coupled to $C_z$.

Thereafter, at a block 354, microprocessor 88 produces an output on line 106 to control switch 320 and selects an integration time period. That is, the duration of the hold signal is selected. At block 356, the panel is driven for impedance touch current determination. The resulting digitized impedance touch current signal $i_{zn}$ is then transferred at Block 358 to the microprocessor 88. At the next block, block 360, a question is asked as to whether the impedance touch current signal is at a desired level. Typically, it is desirable for the digitized impedance touch current signal to be greater than a minimum level for more accurate touch current determination. In addition, it is desirable that the magnitude of the digitized touch current signal be less than a maximum, such as the maximum digitized value capable of being converted by analog to digital converter 84.

To accommodate a wide range of impedance touch currents, and thus facilitate the operation of the device under widely varying conditions, such as when touched by users with and without gloves, the microprocessor provides an automatic gain adjustment. If at block 360, the digitized impedance touch current is not within the desired range, a question is then asked at block 362. This question is whether the gain setting (the integration time period) can be incremented in a proper direction to bring the digitized impedance current to within the desired range or above a minimum. For example, to reduce the digitized value, the integration time period is shortened. Conversely, to increase the digitized value, the integration time period is increased. If the answer at block 362 is yes, a block 364 is reached and the gain setting is incremented. Following this incrementation, block 356 is again reached and the cycle continues. If at block 360 it is determined that the impedance touch current is above the minimum or within the desired range, or it is no longer possible to increment the gain setting to bring the impedance current within the range, then a block 365 is reached. At block 365, the gain setting $G_n$, for the nth sample of impedance current, is stored. In addition, at a following block 366, the digitized impedance touch current value $i_{zn}$ is also stored.

Thereafter, at block 368 the M0 signal is set equal to a logic zero and the M1 signal is set equal to a logic one. This places multiplexer 52 in its first or Y touch current determination state. The touch panel is then driven for the second or Y touch current determination by establishing an alternating current voltage gradient across the touch sensing surface 18 in the Y direction (See block 370). The resulting digitized $i_{yn}$ touch current value is then transferred to microprocessor 88 (block 372) and stored (block 374).

The multiplexer 52 is set at block 376 in its zero state by setting both the M0 control signal and the M1 control signal at a logic zero. At the succeeding block 378, the touch panel is driven for a first or $i_{xn}$ touch current determination by establishing an alternating current voltage gradient across the touch sensing surface 18 in the first or X direction. The resulting digitized $i_{xn}$ touch current value is transferred to the microprocessor and stored (blocks 380, 382). At the next block 384, a question is asked as to whether a particular sample N is equal to the maximum value of N, namely N max. If no, N is incremented by 1 at a block 385 and processing continues at block 352. If the answer at block 384 is yes, then all of the N max samples which are to be used in computing a particular touch panel location have been obtained and the scanning sequence ends at block 385.

The determination of a particular touch location will next be described with reference to the touch determination sequence 400 of FIG. 8. Following a start block 401, the touch panel is calibrated at a block 402. At this block, the nulling circuit 108, is adjusted to null the touch currents at center tap 54 when the touch sensing surface 18 is untouched. In addition, the touch panel is touched at known locations, for example, at the four corners of the touch sensing surface. When touched at these known locations and the touch current information is obtained utilizing the scanning sequence 344 as expanded upon below, the constants in the equations (a)-(e) above may be determined. Next at block 404, some initial conditions are established. Specifically, an error signal E is set equal to 0, a maximum number of errors E max is established, a maximum noise level Max noise is set, a count L is set equal to 0, and a threshold value is set. From block 404, the previously described scanning sequence 344 is reached and then the sample number N is reset to 1 at a block 406.

At block 408, the normalized magnitude of the impedance touch current $i_{zn}$ is calculated for subsequent comparison with a threshold magnitude. The digitized value $i_{zn}$ is normalized for the gain setting used to obtain this value so that an appropriate comparison with the threshold can be made. This computation is as follows:

$$\text{Normalized } i_{zn} = i_{zn}[gs^{(gain\ max-gain)}]$$

In the above equation, gs is equal to the gain step setting, that is the setting of the switch 320 in FIG. 4, gain max is the maximum gain setting, and gain is the previously stored gain $G_n$. Following this computation a question is asked at block 410 as to whether the computed normalized impedance touch current is less than the threshold set at block 404. If yes, a determination is made that the touch panel is not presently being touched. If not being touched, the sequence ends at block 412.

Assume that at block 410, the normalized $i_{zn}$ value is greater than or equal to the threshold. This indicates that the panel is being touched somewhere on the touch sensing surface.

At block 418 a number of computations are made as indicated in this block. In making the indicated computations, there is no need to normalize the digitized touch current values as summed quantities Y/Z and X/Z will be the same regardless of the gain setting. After these calculations are made, at block 420 it is determined whether the sample number N is equal to N max. If not, N is incremented by 1 at block 422 and the cycle returns to block 408. Eventually, all of the N samples will have been processed and a question block 424 is reached.

At block 424, a determination is made as to whether significant variations have occurred in the X and Y touch current values. If so, this indicates that the user is not maintaining the touch sufficiently constant for accurate touch location determination. More specifically, at block 424, unstable touching is indicated if the difference between the maximum Y/Z value and the minimum Y/Z value is greater than the Max noise setting. Likewise, unstable touching is indicated if the difference between the maximum X/Z value and the minimum X/Z value exceeds the Max noise setting. If the Max noise setting is exceeded, block 426 is reached and the error count E is incremented by 1. Then, at a question block 428, a determination is made as to whether E is greater than the maximum number of permitted errors, E max. If so, the sequence is terminated with an error message at block 430. Such a message may indicate to the user that inaccurate determinations of touch location are being made because of, for example, unstable touching of the touch sensing surface. If E is not greater than E max, from block 428 the sequence returns to the scanning sequence block 344 and scanning continues.

Assume that at block 424, unstable touching is not indicated. In this case, from block 424, a block 432 is reached and average $Y_L/Z_L$, average $X_L/Z_L$ and average $Z_L$ values are stored. In addition, at a block 434, touch$_L$ is set true corresponding to the fact that a determination of touch location has been made.

The information obtained in FIG. 8 may be used in a variety of applications. FIG. 9 illustrates one such exemplary application sequence. Referring to FIG. 9, after block 434 in FIG. 8, at block 436 the count L is incremented by one and at block 438 the question is asked if L is greater than one. If not, E is reset to zero at block 439 and scanning sequence block 344 within block 400 is reached. If block 438 a yes determination is made, then at least two touch locations have been determined from the time that the touch sensing surface was first touched. To provide a more accurate touch location determination, new average $Y_L/Z_L$; average $X_L/Z_L$; and average $Z_L$ determinations are made. Each value of $Z_L$ which is averaged is normalized. As a result, variations in $Z_L$ determinations which are unaccompanied by changes in X and Y touch location may be detected and used as explained below. Thus at block 440, the information utilized in determining touch locations and other data is updated to provide a more accurate determination of the touch location. From block 440, the procedure may pass directly to block 439, in which case scanning continues. Alternately, the procedure may pass through a third axis option 442 and then to the block 439.

Assume that after touch$_L$ has been set true, indicating the presence of a touch, and that when block 410 (FIG. 8) is again reached, it is determined that the normalized impedance current is less than the threshold. In this case, instead of ending at block 412, the program may continue at block 443. Since the panel has now been released, block 444 is reached. Thereafter, the coordinates of touch prior to the release of the panel are then computed from the averages found at block 440. The equations (a)-(e) above may be used for this purpose. Thus, in this application, touch location information is averaged from the time the touch panel is first touched until it is released. If at block 443 the prior touch is not true, then the panel is not being touched and end block 450 is reached.

The determined X and Y coordinates are utilized by the user's computer 92. For example, a touch at a particular location may call a subroutine. Also, as will be readily apparent from the above description, touch locations may be continuously determined as a finger is slid across the touch sensing surface and utilized by the user's computer 92 to, for example, trace a picture on the display terminal 14. In addition, the procedures may be used with equations (f)-(m) as set forth above being used in the computations. In this case, the scanning sequence 344 would be varied to generate the appropriate touch current values. Finally, the invention is not limited to the above processing procedures.

With reference to FIG. 9, one form of third axis option includes a first block 460 at which constants $A_y$, $A_x$ and $A_z$ are established. At block 462, a determination is made as to whether the X and Y positions are substantially unchanged. This evaluation is made by comparing the difference between a new Y/Z determination and the previous Y/Z determination with the value $A_y$ and the difference between a new X/Z determination and the prior X/Z determination with the $A_x$ setting. If these differences are not within the established $A_x$ and $A_y$ tolerances, the X and Y coordinates of touch have changed. In this case, the no branch is followed from block 462 to the block 439 and the procedure continues. If the X and Y coordinates are sufficiently constant, a decision block 464 is reached. At block 464, a determination is made as to whether the difference between a new average $Z_L$ and the immediately prior average $Z_L$ is greater than $A_z$. If no, this indicates that the user, although touching the sensing surface at the same location, has not changed the manner of touch. In this case, the no branch from block 464 is followed to block 439. In contrast, if at block 464 the average impedance touch current $Z_L$ has changed significantly while the X and Y locations are substantially the same, the yes branch from block 464 is followed, the average impedance touch current value $Z_L$ may be utilized, and the procedure continues at block 439.

As a specific example, if a user's finger touches a particular location on the touch sensing surface and is then pressed harder at the same location, a change in the average impedance touch current $Z_L$ will result. Upon detection of such a change, the user's computer 92 may call up additional subroutines. For example, touching a first location may cause a first enlargement of a portion of the display on display terminal 14. A harder touch at the same location may cause a further enlargement of this portion of the display. This impedance current information may be utilized in any number of other ways as desired by the user. Also, changes in impedance touch current $Z_L$ values may be determined used in other applications even though $X_L$ and $Y_L$ values have also changed.

TABLE I

| Element | Component |
| --- | --- |
| 130 | 0.1 microfarad capacitor |
| 132 | 100 kilohm amplitude adjustment potentiometer |
| 134 | 4.7 kilohm resistor |
| 136 | 82 kilohm resistor |
| 138 | 91 picofarad capacitor |
| 140 | 267 picofarad capacitor |
| 142 | 790 picofarad capacitor |
| 144 | 1.5 kilohm resistor |
| 146 | 1.5 kilohm resistor |
| 148 | 0.1 microfarad capacitor |
| 150 | 0.1 microfarad capacitor |
| 152 | 5.6 kilohm resistor |
| 154 | 3 kilohm resistor |
| 170 | 0.1 microfarad capacitor |
| 172 | 0.1 microfarad capacitor |
| 174 | 0.1 microfarad capacitor |
| 175 | 3.9 kilohm resistor |
| 176 | 680 ohm resistor |
| 178 | 680 ohm resistor |
| 180 | 3.9 kilohm resistor |
| 182 | 3.9 kilohm resistor |
| 184 | 6.2 kilohm resistor |
| 186 | 10 ohm resistor |
| 188 | 10 ohm resistor |
| 190 | 24 kilohm resistor |
| 294 | 200 kilohm resistor |
| 296 | 1 kilohm resistor |
| 298 | 100 picofarad capacitor |

Having illustrated and described the principles of our invention with reference to several preferred embodiments, it should be apparent to those persons skilled in the art that such invention may be modified in arrangement and detail without departing from such principles.

We claim as our invention all such modifications which come within the true spirit and scope of the following claims:

1. A touch panel device for determining the touch location at which a touch sensing surface of the device is touched comprising:
    signal generator means for producing an alternating-current voltage output;
    transformer means having a primary winding means connected to the signal generator output so as to be driven by the signal generator means, the transformer means also having a secondary winding means with first and second secondary winding outputs and a center tap, the secondary winding means providing a panel scanning signal as the primary winding means is driven by the signal generator output;
    switching means for selectively coupling the secondary winding means to the touch sensing surface so as to selectively apply the panel scanning signal to the touch sensing surface and generate touch current signals at the center tap upon touching of the panel; and
    panel output signal processing means having a first input coupled to the center tap of the transformer means for receiving the touch current signals, the panel output signal processing means comprising means for determining the touch location from the touch current signals.

2. A touch panel device according to claim 1 in which the switching means comprises means for selectively coupling one of the secondary winding outputs to a first side of the touch sensing surface and the other of the secondary winding outputs to a second side of the touch sensing surface, the second side being located across the touch sensing surface in a first direction from the first side, so as to establish a voltage gradient across the touch sensing surface in the first direction from the first to the second sides and so as to provide a first touch current signal at the center tap when the touch sensing surface is touched, the switching means also comprises means for selectively and simultaneously coupling one of the secondary winding outputs to the first and second sides of the touch sensing surface to provide an impedance touch current signal at the center tap when the touch sensing surface is touched, and the panel output signal processing means comprises means for determing the touch location along the first direction from the first touch current signal and the impedance touch current signal.

3. A touch panel device according to claim 2 in which the switching means also comprises means for selectively coupling one of the secondary winding outputs to a third side of the touch sensing surface and the other of the secondary winding outputs to a fourth side of the touch sensing surface, the fourth side being located across the touch sensing surface in a second direction from the first side, so as to establish a voltage gradient across the touch sensing surface in the second direction from the third to the fourth sides and so as to provide a second touch current signal at the center tap when the touch sensing surface is touched, the switching means comprising means for selectively and simultaneously coupling one of the secondary winding outputs to the first, second, third and fourth sides of the touch sensing surface to provide the impedance touch current signal at the center tap when the touch sensing surface is touched, and the panel output signal processing means comprises means for determining the touch location along the first and second directions from the first touch current signal, the second touch current signal and the impedance touch current signal.

4. A touch panel device according to claim 1 in which the switching means comprises means for selectively coupling one of the secondary winding outputs to a first side of the touch sensing surface and the center tap to a second side of the touch sensing surface, the second side being located across the touch sensing surface in a first direction from the first side, so as to establish a voltage gradient across the touch sensing surface in the first direction from the first to the second sides and so as to provide a first touch current signal at the center tap when the touch sensing surface is touched, the switching means comprising means for selectively coupling one of the secondary winding outputs to the second side of the touch sensing surface and the center tap to the first side of the touch sensing surface so as to establish a voltage gradient across the touch sensing surface in the first direction from the second to the first sides and so as to provide a second touch current signal at the center tap when the touch sensing surface is touched, and the panel output signal processing means comprises means for determining the touch location along the first direction from the first and second touch current signals.

5. A touch panel device according to claim 4 in which the switching means comprises means for selectively coupling one of the secondary winding outputs to a third side of the touch sensing surface and the center tap to a fourth side of the touch sensing surface, the fourth side being located across the touch sensing surface in a second direction from the third side, so as to establish a voltage gradient across the touch sensing surface in the second direction from the third to the fourth sides and so as to provide a third touch current signal at the center tap when the touch sensing surface is touched, the switching means comprising means for selectively coupling one of the secondary winding outputs to the fourth side of the touch sensing surface and the center tap to the third side of the touch sensing surface so as to establish a voltage gradient across the touch sensing surface in the second direction from the fourth to the third sides and so as to provide a fourth touch current signal at the center tap when the touch sensing surface is touched, and the panel output signal processing means comprises means for determining the touch locations along the first and second directions from the first, second, third and fourth touch current signals.

6. A touch panel device according to claim 1 in which the panel output signal processing means includes synchronous rectifier circuit means with an input for receiving the touch current signals and a rectifier circuit output, the signal generator means having a synchronization signal output and including means for generating synchronization signals at the synchronization signal output, the rectifier circuit means having a synchronization signal input connected to the synchronization signal output, the rectifier means comprising means for rectifying the touch current signals in synchronization with the synchronization signals to provide an output of rectified touch current signals corresponding to the received touch current signals, integrator circuit means having an integrator input coupled to the rectifier output for receiving the rectified touch current signals and an integrator output, the integrator circuit means comprising means for integrating the rectified touch current signals over integration time periods to provide an analog output of integrated touch current signals corresponding to the rectified touch current signals during such integration time periods, the integrator circuit means including integration timing means coupled to the synchronization signal output for synchronizing the integration time periods to the synchronization signals, analog to digital converter means having a converter input coupled to the integrator output for receiving the integrated touch current signals and for converting the integrated touch current signals to corresponding digital touch current signals, the analog to digital converter means having a converter output at which the digital touch current signals are provided, and the panel output signal processing means also including processor circuit means having an input coupled to the converter output for receiving the digital touch current signals and comprising means for determining the touch location from the digital touch current signals.

7. A touch panel device according to claim 6 in which the panel output signal processing means includes means for adjusting the duration of integration time periods so as to adjust the magnitude of the integrated touch current signals to a magnitude which is greater than a predetermined minimum magnitude.

8. A touch panel device according to claim 3 in which the panel output signal processing means includes synchronous rectifier circuit means with an input for receiving the first, second and impedance touch current signals and a rectifier circuit output, the signal generator means having a synchronization signal output and including means for generating synchronization signals at the synchronization signal output, the rectifier circuit means having a synchronization signal input connected to the synchronization signal output, the rectifier means comprising means for rectifying the first, second and impedance touch current signals in synchronization with the synchronization signals to provide an output of rectified touch current signals corresponding to the received first, second and impedance touch current signals, integrator circuit means having an integrator input coupled to the rectifier output for receiving the rectified touch current signals and an integrator output, the integrator circuit means comprising means for integrating the rectified first, second and impendance touch current signals over integration time periods to provide an analog output of integrated first, second and impedance touch current signals corresponding to the rectified first, second and impedance touch current signals during such integration time periods, the integrator circuit means including integration timing means coupled to the synchronization signal output for synchronizing the integration time periods to the synchronization signals, analog to digital converter means having a converter input coupled to the integrator output for receiving the integrated first, second and impedance touch current signals and for converting the integrated first, second and impedance touch current signals to corresponding digital first, second and impedance touch current signals, the analog to digital converter means having a converter output at which the digital first, second and impedance touch current signals are provided, and the panel output signal processing means also including processor circuit means having an input coupled to the converter output for receiving the digital first, second and impedance touch current signals and comprising means for determining the touch location from the digital first, second and impedance touch current signals.

9. A touch panel device according to claim 8 in which the processor circuit means includes means for determining whether the magnitudes of the digital impedance touch current signals are within a predetermined range of magnitudes, the processor circuit means having an integrator timing output and including means for generating integration timing control signals at such integrator timing output, the integration timing circuit means includes a timing circuit input coupled to the integrator timing output and also includes means for adjusting the duration of integration time periods in response to the integration timing control signals so as to adjust the magnitudes of the integrated impedance touch current signals and thereby the magnitudes of the digital impedance touch current signals to within the predetermined range of magnitudes.

10. A touch panel device according to claim 9 including nulling circuit means coupled to the touch sensing surface for nulling the touch current signals when the touch sensing surface is untouched.

11. A touch panel device according to claim 10 in which the processor circuit means includes means for establishing a threshold impedance current magnitude and also includes means for determining whether the magnitude of the digital impedance touch current signal exceeds the threshold impedance current magnitude to thereby indicate a touch of the touch panel.

12. A touch panel according to claim 8 in which the processor circuit means includes means for repetitively determining the touch location from the digital first, second and impedance touch current signals while the touch sensing surface is touched and for averaging the repetitively determined touch locations so as to determine the touch location as the average of such repetitively determined touch locations.

13. A touch panel device for determining the touch location at which a touch sensing surface of the device is touched comprising:

signal generator means for producing an alternating-current voltage signal output;

panel scanning signal applying means for applying panel scanning signals to the touch sensing surface, the panel scanning signal applying means having an input coupled to the signal generator output, the panel scanning signal applying means having first and second alternating-current voltage scanning outputs which are driven by the signal generator output and which are one hundred and eighty degrees out of phase from one another;

switching means for selectively coupling the first and second panel scanning outputs to the touch sensing surface so as to selectively apply the panel scanning signals to the touch sensing surface and generate touch current signals upon touching of the panel, the switching means comprising means for selectively coupling one of the panel scanning outputs to a first side of the touch sensing surface and the other of the panel scanning outputs to a second side of the touch sensing surface, the second side being located across the touch sensing surface in a first direction from the first side, so as to establish a voltage gradient across the touch sensing surface in the first direction from the first to the second sides and so as to provide a first touch current signal output from the touch sensing surface, the switching means comprising means for selectively coupling one of the panel scanning outputs to a third side of the touch sensing surface and the other of the panel scanning outputs to a fourth side of the touch sensing surface, the fourth side being located across the touch sensing surface in a second direction from the first side, so as to establish a voltage gradient across the touch sensing surface in the second direction from the third to the fourth sides and so as to provide a second touch current signal output from the touch sensing surface when the touch sensing surface is touched, the switching means also comprising means for selectively and simultaneously coupling one of the panel scanning outputs to the first, second, third and fourth sides of the touch sensing surface so as to provide an impedance touch current signal output from the touch sensing surface when the touch sensing surface is touched; and panel output signal processing means having a first input for receiving the first, second and impedance touch current signals, the panel output signal processing means comprising means for determining the touch location from the first, second and impedance touch current signals.

14. A touch panel device according to claim 13 in which the panel output signal processing means includes synchronous rectifier circuit means with an input for receiving the first, second and impedance touch current signals and a rectifier circuit output, the signal generator means having a synchronization signal output and including means for generating synchronization signals at the synchronization signal output, the rectifier circuit means having a synchronization signal input connected to the synchronization signal output, the rectifier means comprising means for rectifying the first, second and impedance touch current signals in synchronization with the synchronization signals to provide an output of rectified touch current signals corresponding to the received first, second and impedance touch current signals, integrator circuit means having an integrator input coupled to the rectifier output for receiving the rectified touch current signals and an integrator output, the integrator circuit means comprising means for integrating the rectified first, second and impedance touch current signals over integration time periods to provide an analog output of integrated first, second and impedance touch current signals corresponding to the rectified first, second and impedance touch current signals during such integration time periods, the integrator circuit means including integration timing means coupled to the synchronization signal output for synchronizing the integration time periods to the synchronization signals, analog to digital converter means having a converter input coupled to the integrator output for receiving the integrated first, second and impedance touch current signals and for converting the integrated first, second and impedance touch current signals to corresponding digital first, second and impedance touch current signals, the analog to digital converter means having a converter output at which the digital first, second and impedance touch current signals are provided, and the panel output signal processing means also including processor circuit means having an input coupled to the converter output for receiving the digital first, second and impedance touch current signals and comprising means for determining the touch location from the digital first, second and impedance touch current signals.

15. A touch panel device according to claim 14 in which the processor circuit means includes means for determining whether the magnitudes of the digital impedance touch current signals are within a predetermined range of magnitudes, the processor circuit means having an integrator timing output and including means for generating integration timing control signals at such integrator timing output, the integration timing circuit means includes a timing circuit input coupled to the integrator timing output and also includes means for adjusting the duration of integration time periods in response to the integration timing control signals so as to adjust the magnitudes of the integrated impedance touch current signals and thereby the magnitudes of the digital impedance touch current signals to within the predetermined range of magnitudes.

16. A touch panel device according to claim 15 including nulling circuit means coupled to the touch sensing surface for nulling the touch current signals when the screen is untouched.

17. A touch panel device according to claim 16 in which the processor circuit means includes means for establishing a threshold impedance current magnitude and also includes means for determining whether the magnitude of the digital impedance touch current signal exceeds the threshold impedance magnitude to thereby indicate a touch of the touch panel.

18. A touch panel according to claim 14 in which the processor circuit means includes means for repetitively determining the touch location from the digital first, second and impedance touch current signals while the touch panel is touched and for averaging the repetitively determined touch locations so as to determine the touch location as the average of such repetitively determined touch locations.

19. A method of determining the touch location at which a touch sensing surface is touched comprising:
simultaneously applying an alternating current voltage signal to each of the sides of the touch sensing surface and generating an impedance touch current signal when the touch sensing surface is touched;
applying an alternating current voltage signal to the touch sensing surface to establish an alternating current voltage gradient across the touch sensing surface in a first direction from a first to a second side of the touch sensing surface and generating a first touch current signal when the touch sensing surface is touched;
applying an alternating current voltage signal to the touch sensing surface to establishing an alternating current voltage gradient across the touch sensing surface in a second direction from a third to a fourth side of the touch sensing surface and generating a second touch current signal when the touch sensing surface is touched; and
determining the touch location from the impedance, first and second touch current signals.

20. A method according to claim 19 comprising the steps of periodically repeating the steps of claim 19 to determine successive touch locations and in which the step of determining the touch locations comprises:
rectifying the impedance, first and second touch current signals in synchronization with the applied alternating current voltage signals;
integrating the rectified impedance, first and second touch current signals over integration time periods;
converting the integrated impedance, first and second touch current signals to digital impedance, first and second touch current signals; and
determining the touch location from the digital impedance, first and second touch current signals.

21. A method according to claim 20 including the steps of determining touch locations from the time the panel is touched at a location until the time the touch at such location is released and averaging the determined touch locations to locate the touched location.

22. A method according to claim 20 including the step of varying the duration of the integration time period to adjust the magnitude of the impedance touch current to within a predetermined range of magnitudes.

23. A method according to claim 20 including the step of averaging a number of samples of the digital impedance, first and second rectified touch current signals and determining the touch location from the averaged samples, the method including the step of generating an error indication in the event the samples deviate from one another by more than a predetermined amount.

24. A method according to claim 23 including the step of varying the number of samples which are averaged and used to determine the touch location.

25. A method according to claim 20 including the step of indicating a no touch condition in the event the magnitude of the impedance current signal is no greater than a threshold magnitude.

26. A method according to claim 19 including the step of monitoring changes in impedance, first and second touch current signals and determining changes in impedance current signals which are unaccompanied by changes in first and second touch current signals.

27. A method of determining the touch location at which a touch sensing surface is touched comprising:
establishing an alternating current voltage gradient across the touch sensing surface in a first direction from a first side to a second side of the touch sensing surface and generating a first touch current signal when the touch sensing surface is touched;
establishing an alternating current voltage gradient across the touch sensing surface in a second direction opposite to the first direction from the second side to the first side of the touch sensing surface and generating a second touch current signal when the touch sensing surface is touched;
establishing an alternating current voltage gradient across the touch sensing surface in a third direction from a third side to a fourth side of the touch sensing surface and generating a third touch current signal when the touch sensing surface is touched;
establishing an alternating current voltage gradient across the touch sensing surface in a fourth direction opposite to the third direction from the fourth side to the third side of the touch sensing surface and generating a fourth touch current signal relative to ground potential when the touch sensing surface is touched; and
determining the touch location from the first, second, third and fourth touch current signals.

* * * * *